United States Patent
Mizuhashi et al.

(10) Patent No.: US 7,751,099 B2
(45) Date of Patent: Jul. 6, 2010

(54) IMAGE READING APPARATUS, IMAGE PROCESSING SYSTEM AND REGISTRATION METHOD IN TWO-SIDE IMAGE READING

(75) Inventors: Satoshi Mizuhashi, Kanagawa (JP); Yasuhisa Mizuta, Kanagawa (JP); Yoshitake Matsubara, Kanagawa (JP); Ayumi Onishi, Kanagawa (JP); Minoru Sodeura, Kanagawa (JP); Sadao Furuoya, Kanagawa (JP); Masato Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1609 days.

(21) Appl. No.: 10/982,831

(22) Filed: Nov. 8, 2004

(65) Prior Publication Data

US 2005/0122544 A1 Jun. 9, 2005

(30) Foreign Application Priority Data

Dec. 4, 2003 (JP) ............................ 2003-405629

(51) Int. Cl.
*H04N 1/04* (2006.01)
*G03G 15/00* (2006.01)

(52) U.S. Cl. ....................... 358/488; 358/474; 358/498; 358/496; 358/1.13; 399/374; 399/82; 399/85; 399/87; 355/23; 355/24

(58) Field of Classification Search ................ 358/1.13, 358/408, 488, 493, 496, 498; 271/226, 264; 399/85, 205, 364, 374; 355/23, 24
See application file for complete search history.

(56) References Cited

U.S. PATENT DOCUMENTS

| 5,298,937 | A | * | 3/1994 | Telle ............................ 355/23 |
| 5,343,269 | A | * | 8/1994 | Yamamoto et al. ............ 355/43 |
| 5,592,576 | A | * | 1/1997 | Hayashi ....................... 382/318 |
| 5,649,033 | A | * | 7/1997 | Morikawa et al. ........... 382/297 |
| 5,715,497 | A | * | 2/1998 | Ueda et al. ..................... 399/17 |
| 5,751,438 | A | * | 5/1998 | Murai et al. ................. 358/403 |
| 5,930,577 | A | * | 7/1999 | Forsthoefel et al. ......... 399/401 |
| 6,168,327 | B1 | * | 1/2001 | Tsuzuki ...................... 400/188 |

(Continued)

FOREIGN PATENT DOCUMENTS

JP 10-229484 A 8/1998

(Continued)

*Primary Examiner*—Twyler L Haskins
*Assistant Examiner*—Dennis Dicker
(74) *Attorney, Agent, or Firm*—Oliff & Berridge, PLC

(57) ABSTRACT

An image reading apparatus including: a paper supply section; a transporting path for transporting a document supplied from the paper supply section; a first sensor which reads an image on a first surface of the document from one side of the transporting path; a second sensor which reads an image on a second surface of the document from the other side of the transporting path; and an image processing section which is constituted so as to correspond to a first reading mode in which two sides of the document are read using the first sensor plural times, and a second reading mode in which two sides of the document are read using the first sensor and the second sensor, and which makes a registration position and direction of an output image in both the first and second reading mode the same.

14 Claims, 15 Drawing Sheets

U.S. PATENT DOCUMENTS

| | | | |
|---|---|---|---|
| 6,169,873 B1 * | 1/2001 | Connolly | 399/365 |
| 6,191,405 B1 * | 2/2001 | Mishima et al. | 250/208.1 |
| 6,995,880 B2 | 2/2006 | Tohyama et al. | |
| 7,019,873 B2 | 3/2006 | Tohyama et al. | |
| 7,130,077 B2 * | 10/2006 | Takahashi et al. | 358/1.9 |
| 7,248,378 B2 * | 7/2007 | Shiraishi | 358/1.13 |
| 7,277,669 B2 * | 10/2007 | Howe | 399/395 |
| 7,495,810 B2 * | 2/2009 | Shiraishi | 358/474 |
| 7,522,321 B2 * | 4/2009 | Chen | 358/498 |
| 2002/0041407 A1 * | 4/2002 | Takahashi et al. | 358/529 |
| 2003/0063332 A1 * | 4/2003 | Sato | 358/474 |
| 2004/0036847 A1 * | 2/2004 | Conrow et al. | 355/24 |

FOREIGN PATENT DOCUMENTS

| | | | |
|---|---|---|---|
| JP | 11-095493 A | | 4/1999 |
| JP | 11095493 | * | 4/1999 |
| JP | A 2000-36887 | | 2/2000 |
| JP | 2000-188666 A | | 7/2000 |
| JP | 10365004 | * | 7/2000 |
| JP | A 2000-356867 | | 12/2000 |
| JP | 2002-118721 A | | 4/2002 |
| JP | A 2002-101259 | | 4/2002 |
| JP | A 2003-134305 | | 5/2003 |
| JP | A 2005-39761 | | 2/2005 |

* cited by examiner

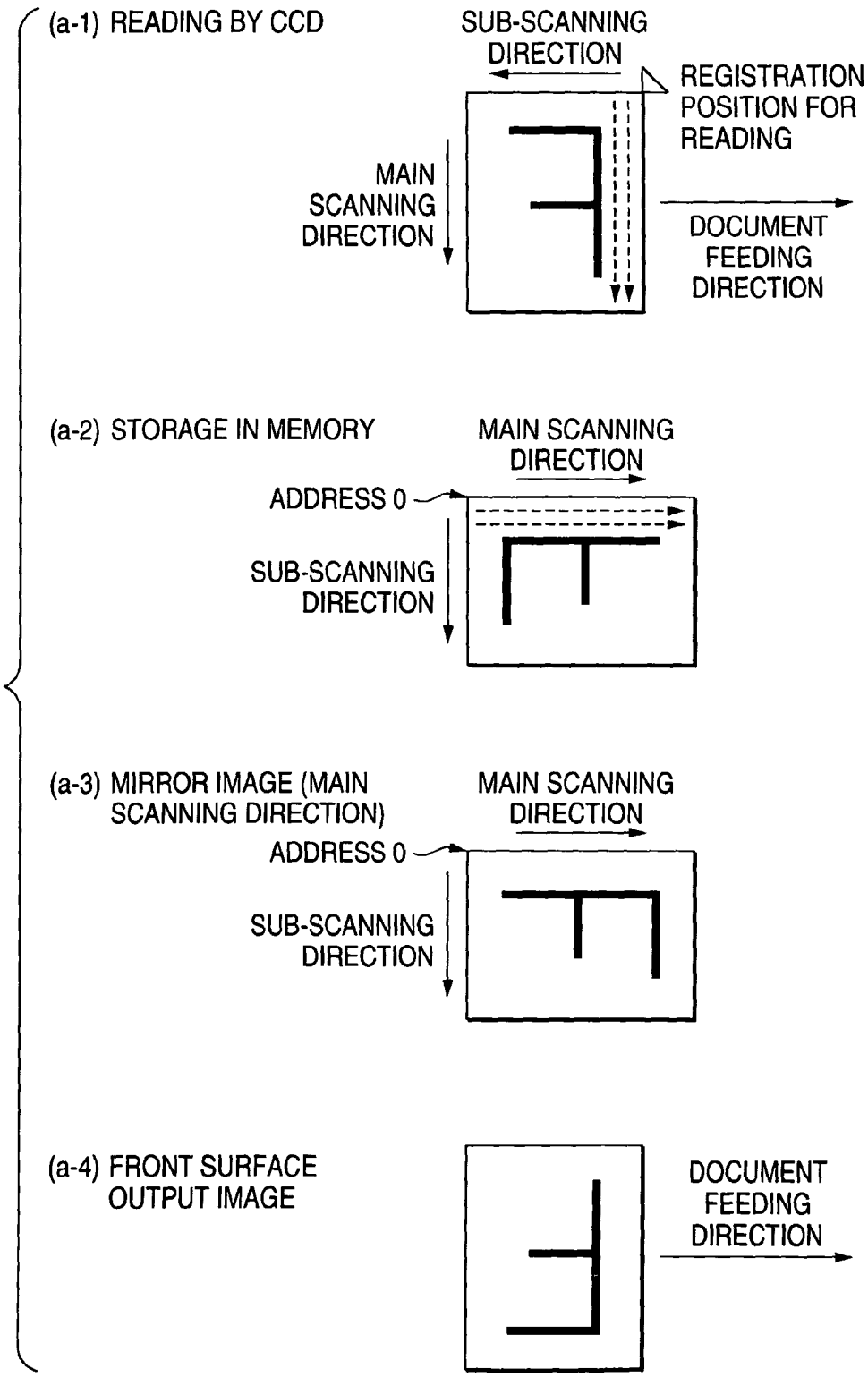

IMAGE READING APPARATUS, IMAGE PROCESSING SYSTEM AND REGISTRATION METHOD IN TWO-SIDE IMAGE READING

BACKGROUND OF THE INVENTION

1. Field of the Invention

The present invention relates to an image reading apparatus which reads an image of a document, and particularly to an image reading apparatus which can read images on two-sided document.

2. Description of the Related Art

Heretofore, as a reading apparatus of a copying machine or a facsimile, or an input scanner for a computer, an image reading apparatus (automatic two-side reading apparatus) has been used, which reads image data on both sides of a document automatically without a user's intervening. The automatic two-side reading apparatus adopts most widely a method of reading image data by inverting the document in a document inverting section. When the image data is input by inverting the document, an image on a front surface is firstly read by a specified document reading section, and thereafter this document is inverted and transported again to this specified document reading section thereby to read an image on a rear surface of the document.

However, in the automatic two-side reading by this inversion, after the document has been discharged once, it must be inverted and thereafter transported again to the document reading section. Accordingly, it takes much time to read the image data on the both surfaces, so that productivity of two-side reading lowers. Therefore, the following technology has been investigated: Two image sensors are provided on both sides of an document path in which the document is transported, and without inverting the document, the both sides of the document are automatically read by single transportation of the document.

Here, in reading of the document, a system in which light of which a light source is a fluorescent lamp is applied onto the document, and its reflected light is read through a reducing optical system by an optical sensor, is generally adopted. In the optical sensor in such the system, for example, a one-dimensional CCD (Charge Coupled Device) sensor is used, and reading is executed by the line by use of such the CCD. In an document reading apparatus using the one-dimensional CCD, when reading of one line in a line direction (main scanning direction) ends, the document is moved slightly in a direction (sub-scanning direction) orthogonal to the main scanning direction thereby to perform reading of the next line. This operation is repeated throughout the entirety of the document, and reading of one page is completed.

In such the reading system, it is necessary to apply the light source onto the document and read the reflected light by the CCD sensor through the reducing optical system using several mirrors. Therefore, the unit is liable to become large as the whole. Especially, it is necessary to set plural image sensors in order to read both surfaces of the document without inverting the document. However, it is difficult to set the plural CCD sensors having the above mechanism from a viewpoint of space. Therefore, in order to address this problem on space, it has been investigated that an image sensor referred to as a CIS (Contact Image Sensor) is used, which uses an LED (Light Emitting Diode) that is small in a shape as a light source, and reads an image directly by a linear sensor through a SELFOC lens.

However, in case that the both sides of the document are simultaneously read using both of reading by the CCD sensor using the reducing optical system and reading by the CIS, due to difference in the light source and difference in depth of field, it becomes difficult to completely match image quality between the CCD sensor side and the CIS side. This problem of image quality matching appears remarkably in a color image. Especially, though this problem does not become large in a color image having a few colors (for example, plus one color image) or a so-called business color image, it is expected that the difference in image quality is remarkable in a catalogue image that attaches importance to an image quality or a photographic image.

Therefore, the present inventor is investigating a document reading apparatus in which there are provided two image-reading sections of a CCD sensor using a reducing optical system and a CIS using no reducing optical system, and an inversion mechanism (inversion path) of the document. According to this document reading apparatus, it is possible to select both of an inversion two-side reading mode in which two sides of the document are read by the same sensor, using the inversion mechanism (inversion path) in a transporting path, and a simultaneous two-side reading mode in which two sides of the document are read using both of the CCD sensor and the CIS without inverting the document. According to user's own convenience of use, the most suitable mode can be selected. For example, in order to make image qualities on the two sides of the document uniform, the inversion two-side reading mode is selected, and in case that importance is attached to productivity (speed) of reading, the simultaneous two-side reading mode is selected.

However, in the inversion two-side reading mode and the simultaneous two-side reading mode, a registration position that is a start position of reading is different between a front surface and a rear surface. In case that the two-sided document is copied in the inversion two-side reading mode, a rear surface output image has the same registration position as a front surface output image. However, in case that the two-sided document is copied in the simultaneous two-side reading mode, a rear surface output image has a registration position by a special sensor for a rear surface, and the registration position is different between the rear surface output image and the front surface output image. This means the output image direction is different by the reading method in spite of the same document, which gives the user a malaise.

SUMMARY OF THE INVENTION

The invention has been made in view of the above circumstances, and provides a technique to match registration positions and directions of output images on the two sides of the document.

An image reading apparatus according to the invention includes a paper supply section which supplies a document; a transporting path which transports the document supplied from this paper supply section; a first sensor which reads an image on a first surface of the document from one side of the transporting path; a second sensor which reads an image on a second surface of the document from the other side of the transporting path; and an image processing section which is constituted so as to correspond to a first reading mode in which two sides of the document are read using this first sensor plural times, and to a second reading mode in which two sides of the document are read using the first sensor and the second sensor, and which makes a direction of a registration position of an output image in case that the two sides of the document are read in the first reading mode the substantially same as a direction of a registration position of an output image in case that the two sides of the document are read in the second reading mode.

To make the registration position and direction the same in the invention does not attach importance to whether the position shifts or not, and does not mean that even the position of a dot is made the same strictly, but means that when an image is output onto paper, a print direction of its image surface or a direction of the image is the same. Hereinafter, matching of position also section that the print direction on the image surface, or the direction of the image is the same. This image processing section may include memory controllers, which control the first memory and the second memory.

BRIEF DESCRIPTION OF THE DRAWINGS

Embodiments of the present invention will be described in detail based on the following figures, wherein:

FIGS. 9A and 9B are diagrams showing a processing example in which the registration matching of data on the rear surface is executed in the simultaneous two-side reading mode;

DETAILED DESCRIPTION OF THE INVENTION

The invention will be described below in detail with reference to embodiments shown in attached drawings.

Figure 1:
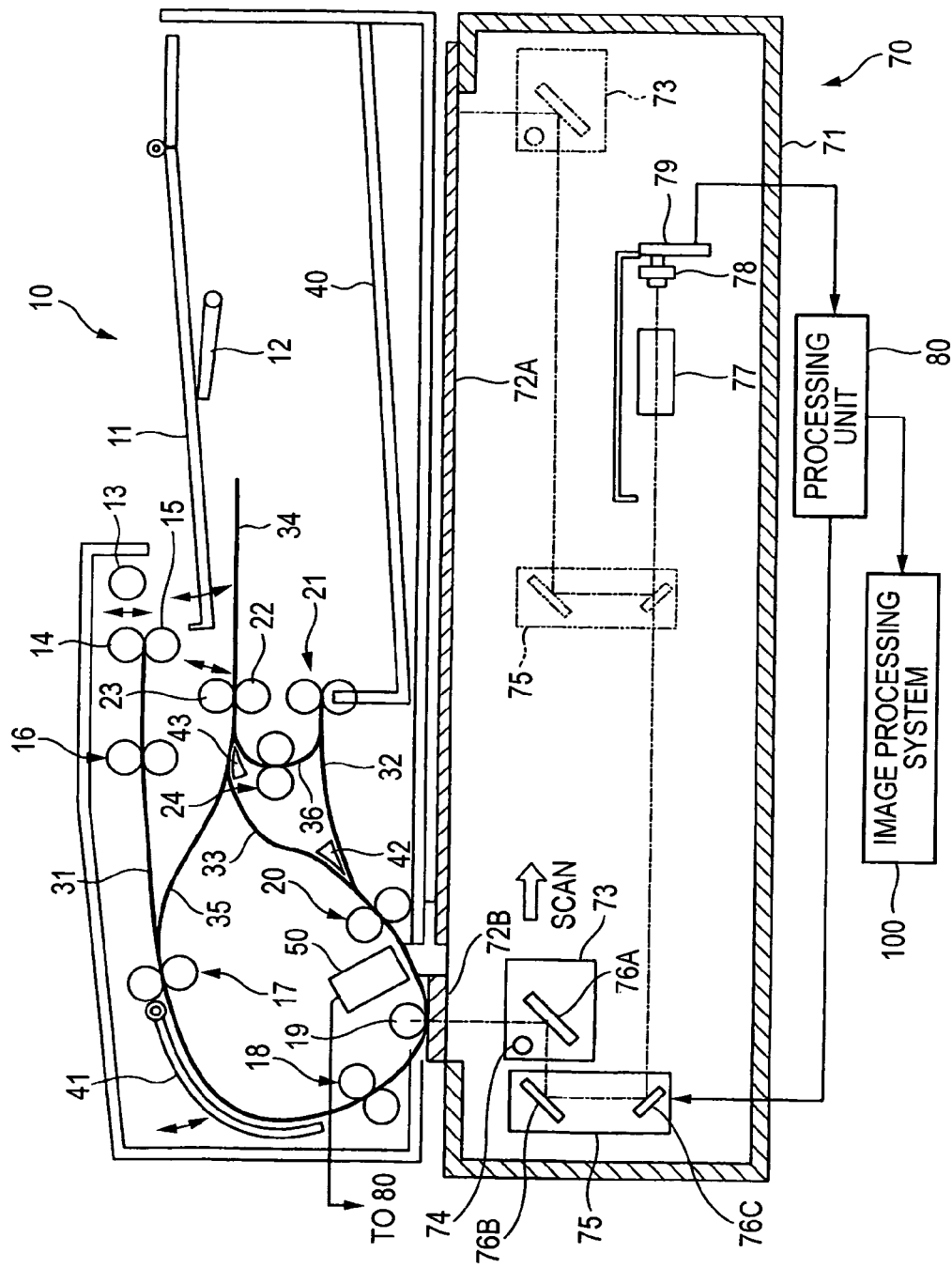
FIG. 1 is a diagram showing an image reading apparatus to which an embodiment of the invention is applied.

FIG. 1 is a diagram showing an image reading apparatus to which an embodiment of the invention is applied. This image reading apparatus has roughly a document feeder 10 which transports documents in order from a bundle of stacked documents; a scanner unit 70 which reads an image by scanning; a processing unit 80 which processes the read image signal; and an image processing system 10 which performs image processing for output from the processing unit 80.

The document feeder 10 includes, as components of a paper supply section, a document tray 11 on which a bundle of plural documents is stacked, and a tray lifter 12 which raises and lowers the document tray 11. Further, the document feeder 10 includes a Nudger roll 13 which transports the document on the document tray 11 raised by the tray lifter 12, a feed roll 14 which transports the document transported by the Nudger roll 13 further to the downstream side, and a retard roll 15 which flicks the documents supplied by the Nudger roll 13 one by one. A first transporting path 31 to which the document is firstly transported includes a take-away roll 16 which transports the documents flicked one by one to a roll on the downstream side; a pre-registration roll 17 which transports the document further to the downstream side and forms a loop; a registration roll 18 which restarts rotation with timing after stopping once, and supplies the document to an document reading section while performing registration adjustment; a platen roll 19 which assists the document which is being read in its transportation; and an out roll 20 which transports the read document further to the downstream. Further, in the first transporting path 31, a baffle 41 is provided, which rotates about a supporting point according to a loop state of the transported document. Further, between the platen roll 19 and the out roll 20, a CIS (Contact Image Sensor) 50 that is a second sensor in this embodiment is provided.

On the downstream side of the out roll 20, a second transporting path 32 and a third transporting path 33 are provided, and further there are provided a transporting path switching gate 42 for switching these transporting paths, a discharge tray 40 on which the document on which reading has been completed is stacked, and a first discharge roll 21 for discharging the document to the discharge tray 40. Further, there are provided a fourth transporting path 34 which switches back the document transported through the third transporting path 33; an inverter roll 22 and an inverter pinch roll 23 which are provided in the fourth transporting path 34, and perform actually switching-back of the document; a fifth transporting path 35 which leads the document switched back by the fourth transporting path 34 again to the first transporting path 31 including the pre-registration roll 17; a sixth transporting path 36 which discharges the document switched back by the fourth transporting path 34 to the discharge tray 40; a second discharge roll 24 which is provided in the sixth transporting path 36, and transports the inverted document to the first discharge roll 21; and an exit switching gate 43 for switching the transporting paths of the fifth transporting path 35 and the sixth transporting path 36.

The Nudger roll 13 is lifted up in a standby condition and held in a retreat position. In document transportation, the Nudger roll 13 descends to a nip position (document transporting position) and transports the uppermost document on the document tray 11. The Nudger roll 13 and the feed roll 14 transport the document by coupling to a feed clutch (not shown). The pre-registration roll 17 causes a leading end of the document to butt against the stopping registration roll 18 thereby to form a loop. In the registration roll 18, the document leading end interlocked into the registration roll 18 in the loop formation is returned to a nip position. As soon as this loop is formed, the baffle 41 opens with the supporting point as a center, and functions so as not to obstruct the loop of the document. Further, the take-away roll 16 and the pre-registration roll 17 hold the loop of the document during the reading operation. By this loop formation, the read timing is adjusted, and further skew with the document transportation in reading is suppressed, whereby the adjustment function of registration can be heightened. With reading-start timing, the stopping registration roll 18 starts its rotation, the document is pressed on a second platen glass 72B (described later) by the platen roll 19, and image data of the document is read from the lower surface.

The transporting path switching gate 42 is switched so as to, when reading of a one-sided document ends, and when simultaneous two-side reading of a two-sided document ends, lead the document that has passed through the out roll 20 to the second transporting path 32 and discharge it to the discharge tray 40. On the other hand, this transporting path switching gate 42 is switched in sequential reading of the two-sided document, so as to lead the document to the third transporting path 33 in order to invert the document. The inverter pinch roll 23, in sequential reading of the two-sided document, is retracted in a state where the feed clutch (not shown) is OFF thereby to open the nip, and leads the document to the inversion path (fourth transporting path 34). Thereafter, this inverter pinch roll 23 is nipped, leads the document inverted by the inverter roll 22 to the pre-registration roll 17, or transports the inverted and discharged document to the second discharge roll 24 in the sixth transporting path 36.

The scanner unit 70 is constituted so that the document feeder 10 can be placed on the scanner unit, supports this document feeder 10 by a unit frame 71, and performs image reading of the document transported by the document feeder 10. In this scanner unit 70, a first platen glass 72A on which an document of which an image is to be read is placed in a static state, and a second platen glass 72B having a light opening for reading the document during being transported by the document feeder 10 are provided for the unit frame 71 forming a housing.

Further, the scanner unit 70 includes a full rate carriage 73 which rests below the second platen glass 72B, and scans throughout the entirety of the first platen glass 72A to read an image; and a half rate carriage 75 which gives the light obtained from the full rate carriage 73 to an imaging section. The full rate carriage 73 includes an illumination lamp 74 which irradiates the document with the light, and a first mirror 76A which receives the reflected light obtained from the document. Further, the half rate carriage 75 includes a second mirror 76B and a third mirror 76C which give the light obtained from the first mirror 76A to the imaging section. Further, the scanner unit 70 includes an imaging lens 77 which optically reduces an optical image obtained from the third mirror 76C; a CCD (Charge Coupled Device) image sensor 78 which converts an optical image formed by the imaging lens 77 into an electric image signal; and a driving substrate 79 which includes the CCD image sensor 78. The image signal obtained by the CCD image sensor 78 is transmitted through the driving substrate 79 to the processing unit 80.

Here, firstly, in case that an image on an document placed on the first platen glass 72A is read, the full rate carriage 73 and the half rate carriage 75 move in the scanning direction (direction of an arrow) at a rate of 2:1. At this time, the light of the illumination lamp 74 of the full rate carriage 73 is applied on a read surface of the document, and the reflected light from its document is reflected to the first mirror 76A, the second mirror 76B, and the third mirror 76C in that order and led to the imaging lens 77. The light led to the imaging lens 77 is formed into an image on a light-receiving surface of the CCD image sensor 78. The CCD image sensor 78 is a one-dimensional sensor, and processes data of one line simultaneously. When reading of one line in this line direction (main scanning direction) ends, the full rate carriage 73 is moved in a direction (sub-scanning direction) orthogonal to the main scanning direction, and reading of the next line of the document is performed. These operations are executed throughout the entirety of the document size thereby to complete one-page reading of the document.

On the other hand, the second platen glass 72B is composed of a transparent glass plate having a long plate-shaped structure. The document transported by the document feeder 10 passes on this second platen glass 72B. At this time, the full rate carriage 73 and the half rate carriage 75 are in a stop state in a position of solid lines shown in FIG. 1. Firstly, the reflected light of the first line of the document that has passed through the platen roll 19 of the document feeder 10 is formed into an image through the first mirror 76A, the second mirror 76B, and the third mirror 76C in the imaging lens 77, and the image is read by the CCD image sensor 78 that is a first sensor in the embodiment. Namely, the image data of one line in the main scanning direction are simultaneously processed by the CCD image sensor 78 that is the one-dimensional sensor, and thereafter the image data of the next line in the main scanning direction of the document transported by the document feeder 10 are read. After the leading end of the document has arrived in the reading position of the second platen glass 72B, the document passes through the reading position of the second platen glass 72B, whereby reading of one page in the sub-scanning direction is completed.

In the embodiment, in transportation of the document in which the full rate carriage 73 and the half rate carriage 75 are stopped, and reading on the first surface of the document is performed at the second platen glass 72B by the CCD image sensor 78, reading on a second surface of the document can be simultaneously (not in complete conformity of time but in the same document transporting time) performed by the CIS 50 that is the second sensor. Namely, using the CCD image sensor 78 that is the first sensor, and the CIS 50 that is the second sensor, by single transportation of the document to the transporting path, the images on the both sides of this document can be simultaneously read.

Figure 2:
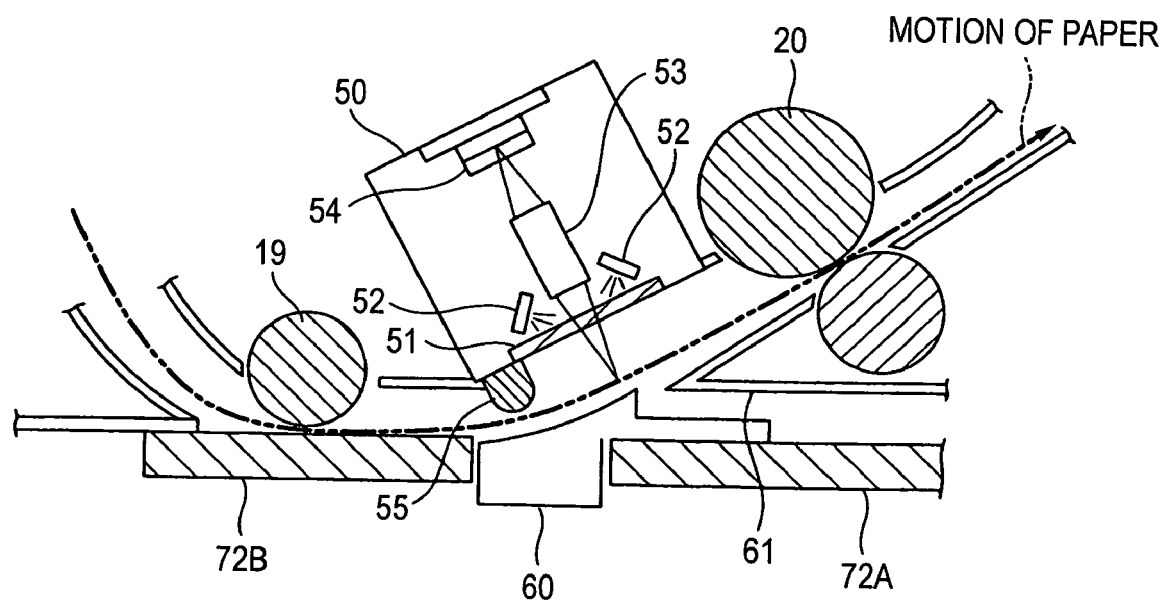
FIG. 2 is a diagram for explaining the reading structure using a CIS.

FIG. 2 is a diagram for explaining the reading structure using the CIS 50. As shown in FIG. 2, the CIS 50 is provided between the platen roll 19 and the out roll 20. The one side (first surface, front surface) of the document is pressed against the second platen glass 72B, and the image on this first surface is read by the CCD image sensor 78. On the other hand, by the CIS 50, from the other side opposed to the second platen glass 72B with the transporting path between, an image on the other side (second surface, rear surface) of the document is read. This CIS 50 has a glass 51; an LED (Light Emitting Diode) 52 which irradiates the second surface of the document with light through this glass 51; a SELFOC lens 53 that is a lens array for collecting the reflected light from the LED 52; and a line sensor 54 that is an image sensor which reads the light collected by this SELFOC lens 53. As the line sensor 54, a CCD, a CMOS sensor, or a contact type sensor can be used, whereby an image of the actual width (for example, 297 mm in longitudinal width of A4) can be read. The CIS 50, without using the reducing optical system, takes the image by use of the SELFOC lens 53 and the line sensor 54. Therefore, the structure can be simplified, the size of a housing of the CIS 50 can be reduced, and consumed electric power can be reduced. Further, in case that a color image is read, LED light sources of three colors comprising R (red), G (green) and B (blue) may be combined with the LED 52, and a set of three-line sensor for RGB may be used as the line sensor 54. Similarly to reading of the image on the first surface, after data of one line in the main scanning direction have been simultaneously processed by the one-dimensional line sensor 54, an image of the next line in the main scanning direction of the transported document is read. Thus, regarding the rear surface of the transported document, reading of one page in the sub-scanning direction is performed.

Further, in image reading by the CIS 50, in the transporting path constituting this reading section, there are provided a control member 55 extending from the housing of the CIS 50, and a butt member 60 which butts the paper pressed by the control member 55. Further, on the downstream side of this butt member 60, a guide member 61 is provided. The control member 55 and the butt member 60 are provided in the direction orthogonal to the transporting path of the document (namely, in the direction from the front surface to the rear surface of the document feeder) from the front surface of the document feeder to the rear surface thereof correspondingly to the position of the transporting path.

Further, since the CIS 50 adopts the SELFOC lens 53 as an optical imaging lens, depth of focus (field) is shallow, about ±0.3 mm, which is one-thirteenth as deep as the depth in case that the scanner unit 70 is used. In reading by the CIS 50, it is necessary to set a reading position of the document in the predetermined narrow range. Therefore, in the embodiment, the control member 55 is provided to transport the document while pressing the document against the butt member 60, whereby a posture of the document between the platen roll 19 and the out roll 20 can be controlled stably. An arrow of two-dot dash lines in FIG. 2 shows the motion of paper in case that the control member 55 is provided. From this arrow, it can be understood that the document is transported while being pressed against the butt member 60. Namely, in the state where the transported document is pressed against the butt member 60 by the control member 55, the image on the document is read, whereby looseness of focus in case that the CIS 50 of which depth of field is shallow is used is improved.

Next, two two-side reading modes (an inversion two-side reading mode and a simultaneous two-side reading mode) used in the image reading apparatus shown in FIG. 1 will be described.

Figure 3A:
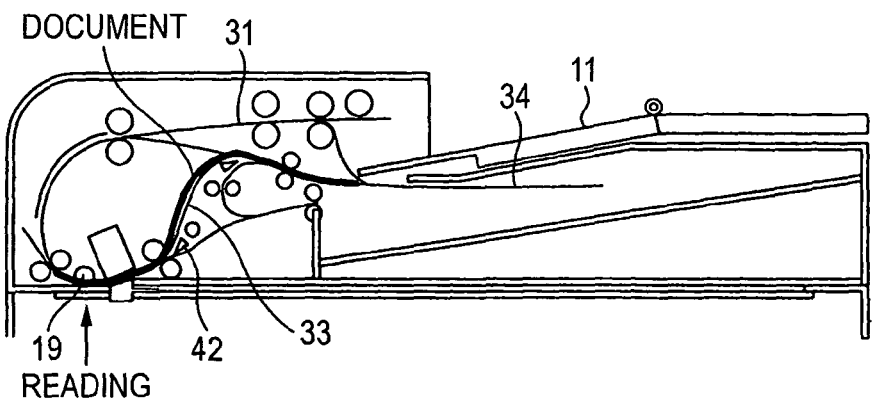
FIGS. 3A to 3D are diagrams for explaining an inversion two-side reading mode using an inversion path.
Figure 3B:
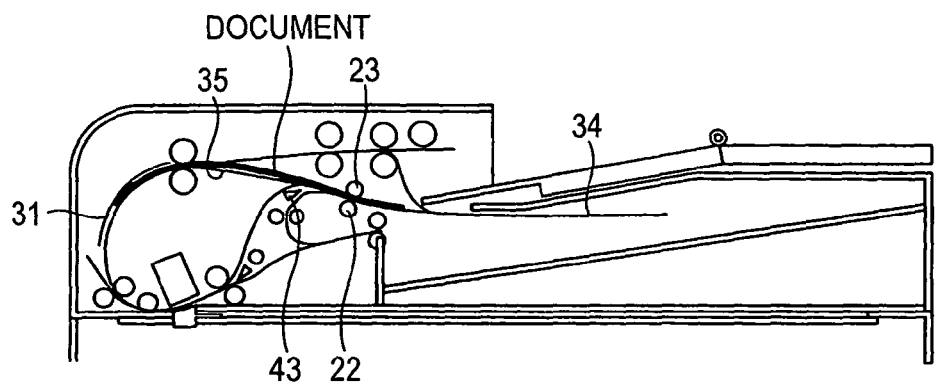

FIGS. 3A to 3D are diagrams for explaining the inversion two-side reading mode using an inversion path. The documents placed on the document tray 11, as shown in FIG. 3A, are supplied to the first transporting path 31 in order, and using the CCD image sensor 78 of the scanner unit 70 shown in FIG. 1, reading is performed from the downside at the position of the platen roll 19. Next, the document is moved by the transporting path switching gate 42 through the third transporting path 33 to the fourth transporting path 34. The document that has completely comes out from the transporting path 33, as shown in FIG. 3B, is switched back by the inverter roll 22 and the inverter pinch roll 23, and supplied to the fifth transporting path 35.

Figure 3C:
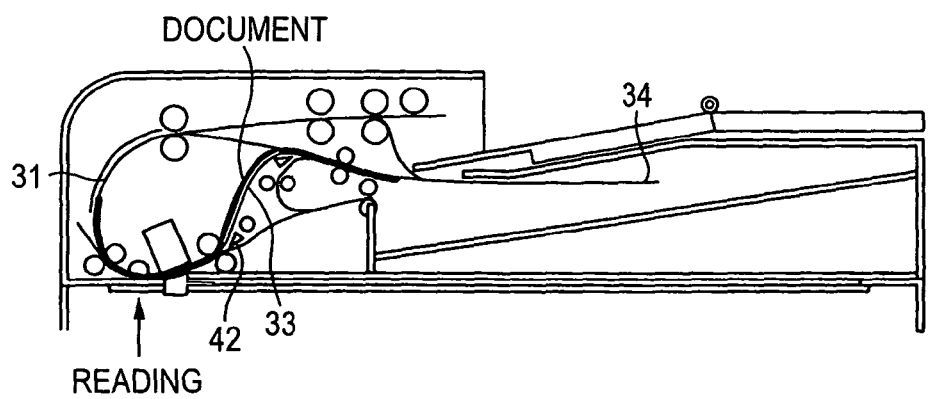
Figure 3D:
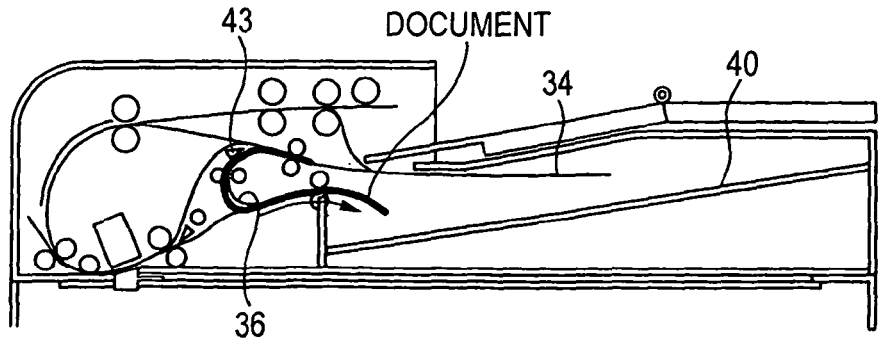

The document supplied to the fifth transporting path 35 is again supplied to the first transporting path 31. Thereafter, as shown in FIG. 3C, the document is read by the CCD image sensor 78 of the scanner unit 70 from the downside. At this time, the document, compared with the case shown in FIG. 3A, is in an inverted state, and the second surface is read, which is different from the first surface in a side of the document. Since the document of which the second surface has been read is in the inverted state, if it is discharged to the discharge tray 40 as it is, the order of pages of the documents after being read is disturbed. Therefore, as shown in FIG. 3C, the document of which the second surface has been read is moved by the transporting path switching gate 42 through the third transporting path 33 to the fourth transporting path 34. The document which has been supplied to the fourth transporting path 34 and has passed through the exit switching gate 43 completely, as shown in FIG. 3D, is moved by the exit switching gate 43 to the sixth transporting path 36, and discharged to the discharge tray 40. Hereby, in case that the image on the surface of the document and the image on the rear surface thereof are in order read using the inversion path, the pages of the documents after being read can be ordered. The automatic document feeder using such the inversion path is used in a case that the reading position is limited to the specified position even in case of a one-sided document.

Figure 4A:
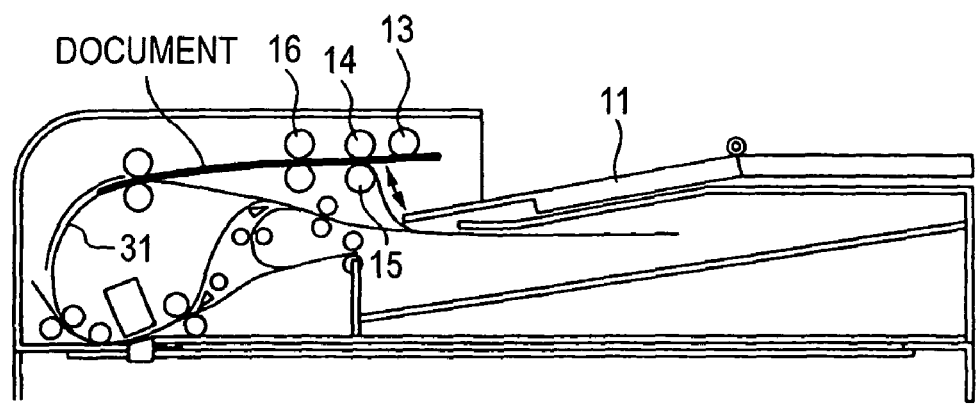
FIGS. 4A and 4B are diagrams for explaining a simultaneous two-side reading mode using a single path (without using the inversion path), to which the embodiment is applied.
Figure 4B:
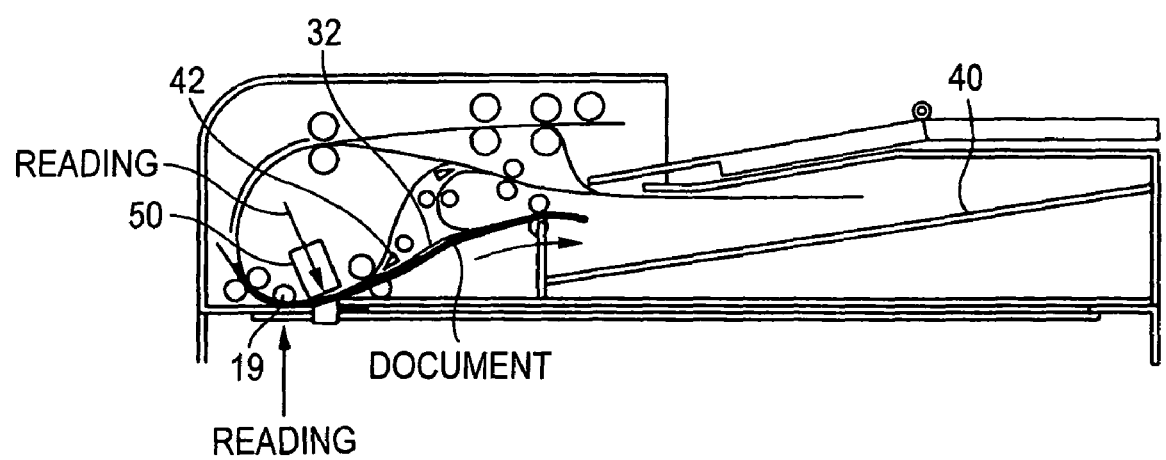

FIGS. 4A and 4B are diagrams for explaining the simultaneous two-side reading mode using one path (using no inversion path) to which the embodiment is applied. As shown in FIG. 4A, the documents on the document tray 11 are supplied in order by the Nudger roll 13, the feed roll 14, retard roll 15, and the take-away roll 16 to the first transporting path 31. The supplied documents, as shown in FIG. 4B, move to the reading section of the platen roll 19 and the reading section of the CIS 50, are moved by the transporting path switching gate 42 to the second transporting path 32, and are discharged onto the discharge tray 40 in order. As described above, in case of simultaneous two-side reading by one path, the first surface is read using the CCD image sensor 78 that is the image reading section of the scanner unit 70 using the reducing optical system, and the second surface is read using the CIS 50 in the same transportation. Hereby, the front surface and the rear surface of the document can be read by single document-pass.

Next, the processing unit 80 shown in FIG. 1 will be described.

Figure 5:
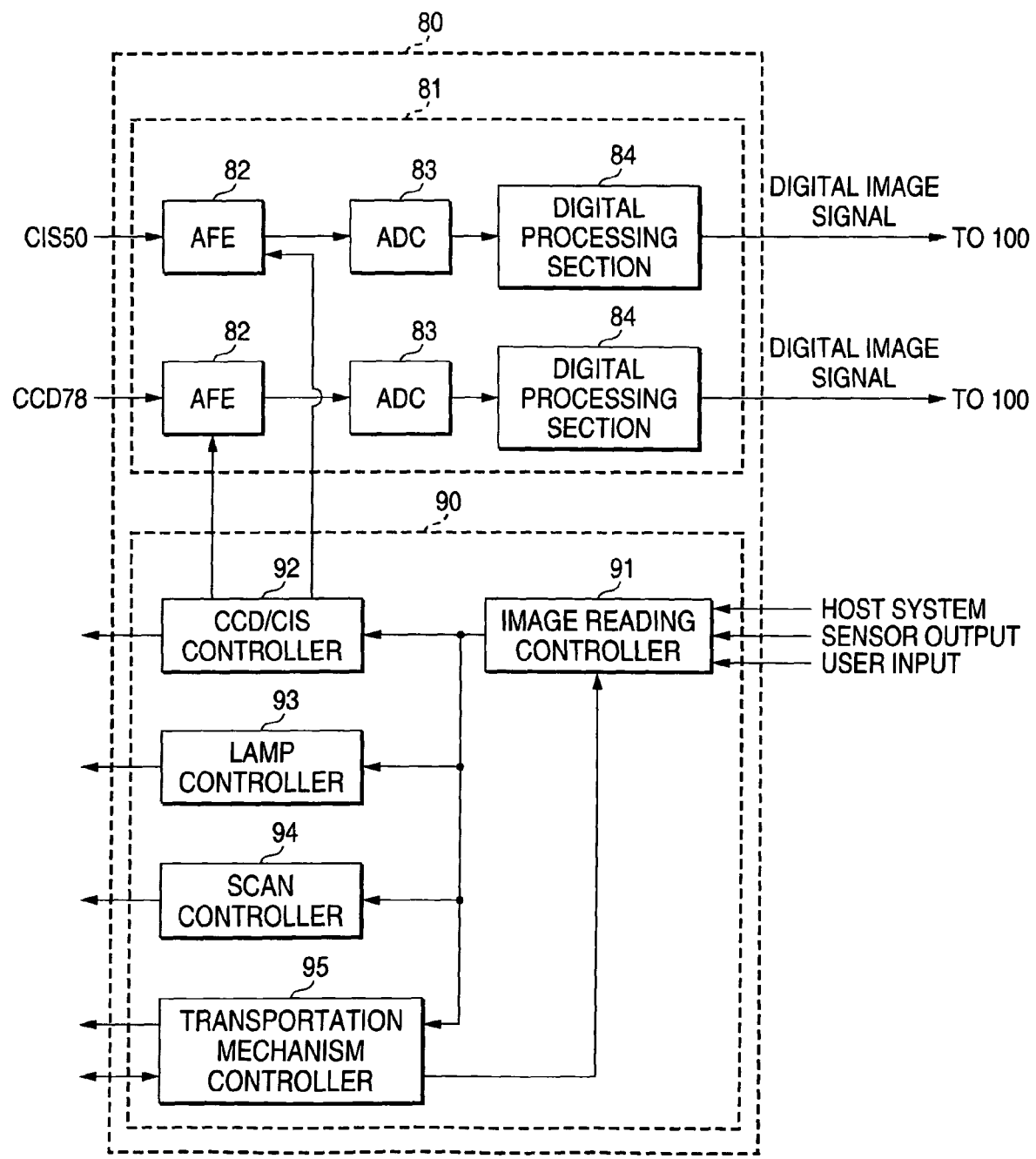
FIG. 5 is a block diagram for explaining a processing unit.

FIG. 5 is a block diagram for explaining the processing unit 80. The processing unit 80 to which the embodiment is applied has roughly a signal processing section 81 which processes image data obtained by the sensor (CCD image sensor 78 and line sensor 54), and a control section 90 which controls the document feeder 10 and the scanner unit 70. The signal processing section 81 includes two AFEs (Analog Front End) 82 which applies analog signal processing to each output from the CCD image sensor 78 reading the surface (first surface) and from the line sensor 54 reading the rear surface (second surface), two ADCs (Analog to Digital Converter) 83 which converts the analog signal into a digital signal, and two digital processing sections 84 which applies to the digital signal each kind of processing such as shading adjustment and offset adjustment. The front surface (first surface) and the rear surface (second surface) are subjected to the digital processing individually. The digital signal processed by this digital processing section 84 is subjected to processing of conversion of resolution in the image processing system (IPS) 100, and output to, for example, an IOT (Image Output Terminal) of a printer or a host system of a personal computer (PC).

On the other hand, the control section 90 has an image reading controller 91 which controls, including control of two-side reading and control of one-side reading, the whole of the document feeder 10 and the scanner unit 70; a CCD/CIS controller 92 which controls the CCD image sensor 78 that is the first sensor, and the CIS 50; a lamp controller 93 which controls, according to a reading timing, the LED 52 of the CIS 50 and the illumination lamp 74 of the full rate carriage 73; a scan controller 94 which switches on/off the motor of the scanner unit 70 thereby to control the scan operations of the full rate carriage 73 and the half rate carriage 75; and a feed mechanism controller 95 which controls the motor in the document feeder 10, and controls the operations of various rolls, the operation of the feed clutch, and the gate switching operation. From these various controllers, control signals are output to the document feeder 10 and the scanner unit 70, and on the basis of these control signals, these operation controls can be performed. The image reading controller 91, on the basis of the control signal from the host system, sensor output detected in the automatic selection reading function, or user's selection, sets a reading mode, and controls the document feeder 10 and the scanner unit 70. As reading modes as described above, a simultaneous two-side reading mode using one path (without inversion), an inversion two-side reading mode using an inversion path, and a one-side reading mode using one path are thought.

Next, the function and operation of the image processing system 100 will be described.

Figure 6:
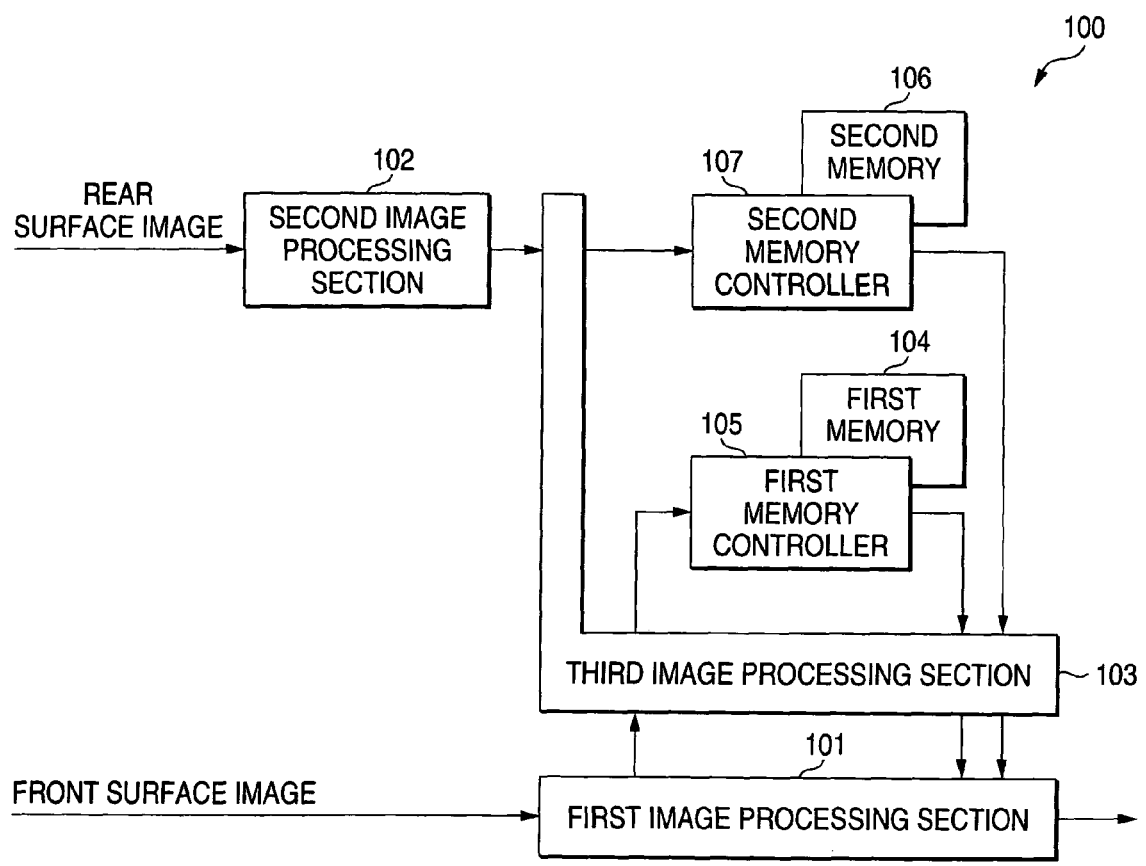
FIG. 6 is a block diagram showing the constitution of an image processing system to which the embodiment is applied.

FIG. 6 is a block diagram showing the constitution of the image processing system 100 to which the invention is applied. The image processing system 100 has a first image processing section 101 which processes the image data on the front surface (first surface) that has been obtained from the CCD image sensor 78 and digitalized by the digital processing section 84; a second image processing section 102 which processes the image data on the rear surface (second surface) that has been obtained from the CIS 50 and digitalized by the digital processing section 84; a third image processing section 103 which executes processing such as sorting of the data; a first memory 104 which saves the front surface image data processed by the first image processing section 101; a first memory controller 105 which controls this first memory 104; a second memory 106 which saves the rear surface image data processed by the second image processing section 102; and a second memory controller 107 which controls this second memory 106.

The image on the front surface (first surface) obtained by the CCD image sensor 78 is subjected to the conversion of resolution in the first image processing section 101 according to necessity, and written into the first memory 104. Further, depending on the constitution of the system, generation of a mirror image (described later) is executed. The image on the rear surface (second surface) obtained by the CIS 50 is subjected to the conversion of resolution in the second image processing section 102 according to necessity, and written into the second memory 106. Further, depending on the constitution of the system, generation of a mirror image (described later) is executed. The image data on the front surface stored in the first memory 104 is subjected to, for example, rotation of 180° (described later) by the first memory controller 105. Further, the image data on the rear surface stored in the second memory 106 is subjected to, for example, rotation of 180° (described later) by the second memory controller 107 similarly.

Here, in the usual image processing, in order to heighten productivity of processing, two-system image processing, for example, Odd/Evn of an odd number/even number is adopted. For example, in case that by this Odd/Evn, the rear surface image is written into the second memory, and the rotation of 180° is executed, the data are arranged in the Evn/Odd manner. Therefore, in the third image processing section 103, the data are sorted by the Odd/Evn. Further, only in case that directions of registration of the front surface and rear surfaces are matched (registration matching), the number of the memories and the number of the memory controllers may be respectively single. However, in case that, for example, taking productivity of one-side image reading as 100%, the productivity is made 200% by performing the two-side image reading, it is preferable that for execution of registration matching at the productivity of 200%, a set of a memory and a memory controller is provided for each of the front surface and the rear surface (first memory 104 and first memory controller 105, and second memory 106 and second memory controller 107) like the case in this embodiment.

Next, matching of a registration position for reading will be described with reference to FIGS. 7A to 10B.

Here, its explanation is based on assumption that: a two-sided document to be read is a booklet which is used on business most frequently, opened to the left and right, and has the heaven as an upside, that is, considering a case where the longitudinal side (for example, the long side of 297 mm in A4 size of 210×297) of the document is bound, the document viewed as a single, the upsides on a front surface and a rear surface are the same direction, and the predetermined short side (for example, the short side of 210 mm in the A4 size) is the upside. On the front surface and the rear surface of this document, the same short side becomes the upside. Further, the document feeder 10 is based on the assumption that the long side of such the document is caused to butt against the leading end of the document tray 11 and the document is transported in its longitudinal direction as a main scanning direction (for example, in case of an A4 document, the document feeder 10 presupposes A4 LEF (Long Edge Feed). Further, a bundle of the documents to be read are placed on the document tray 11 shown in FIG. 1 so that the first page is located at the top. Further, in examples shown in FIGS. 7A to 10B, "F" characters in alphabet are drawn on the whole surfaces of the two-sides of the document with the short side of the document upper. In case that the document is placed on the document tray 11 with the first surface (front surface) upper, the placed document is fed from a reading position in order from the long side near a longitudinal line of the "F" character. Further, the rotation processing of the image and the mirror image processing are based on the assumption that the used memories are the first memory 104 and the second memory 106. However, the predetermined work memories may be provided for each image processing section and each controller thereby to perform the processing by use of these memories.

Figure 7A:
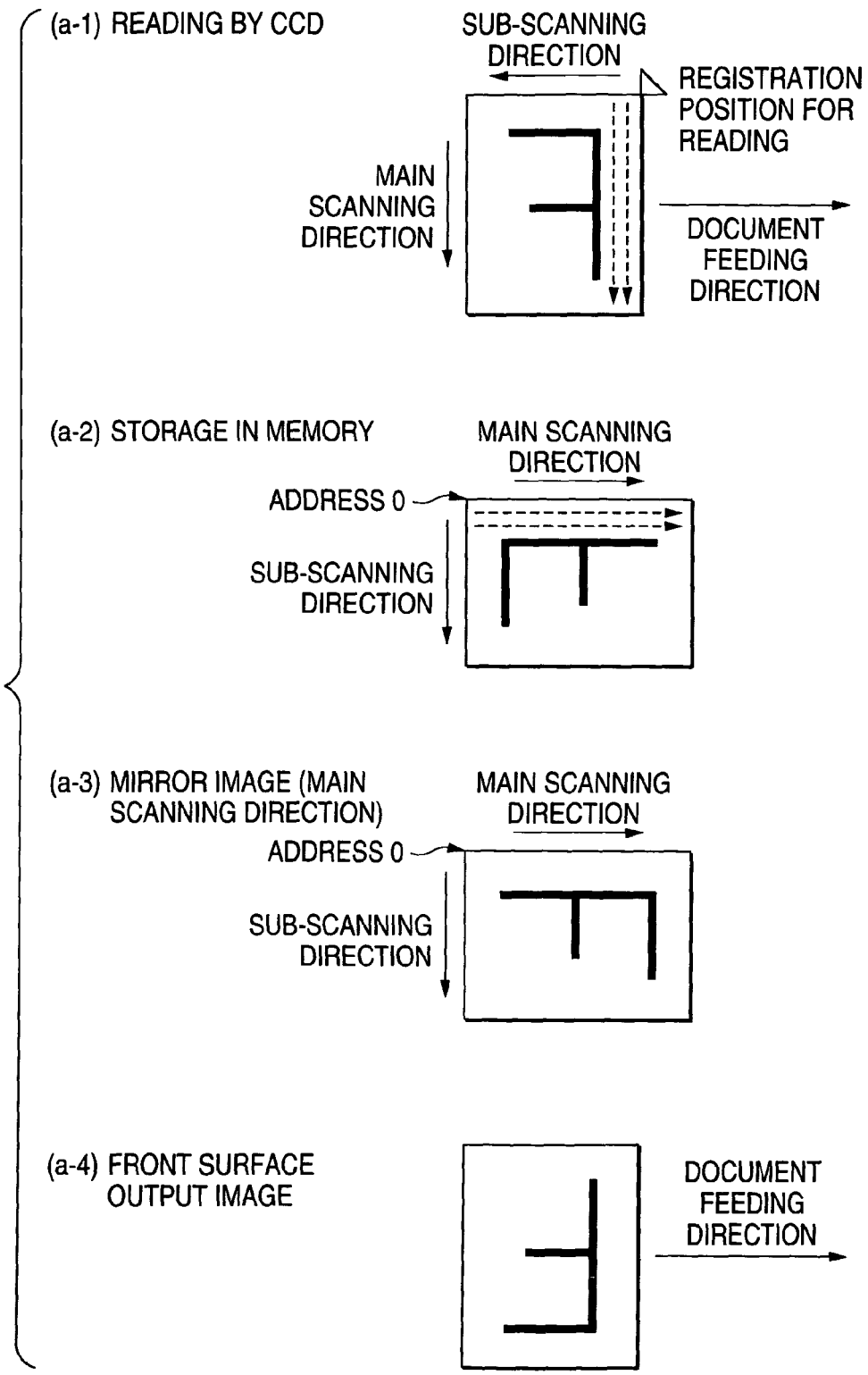
FIGS. 7A and 7B are diagrams for explaining a registration position in the inversion two-side reading mode.
Figure 7B:
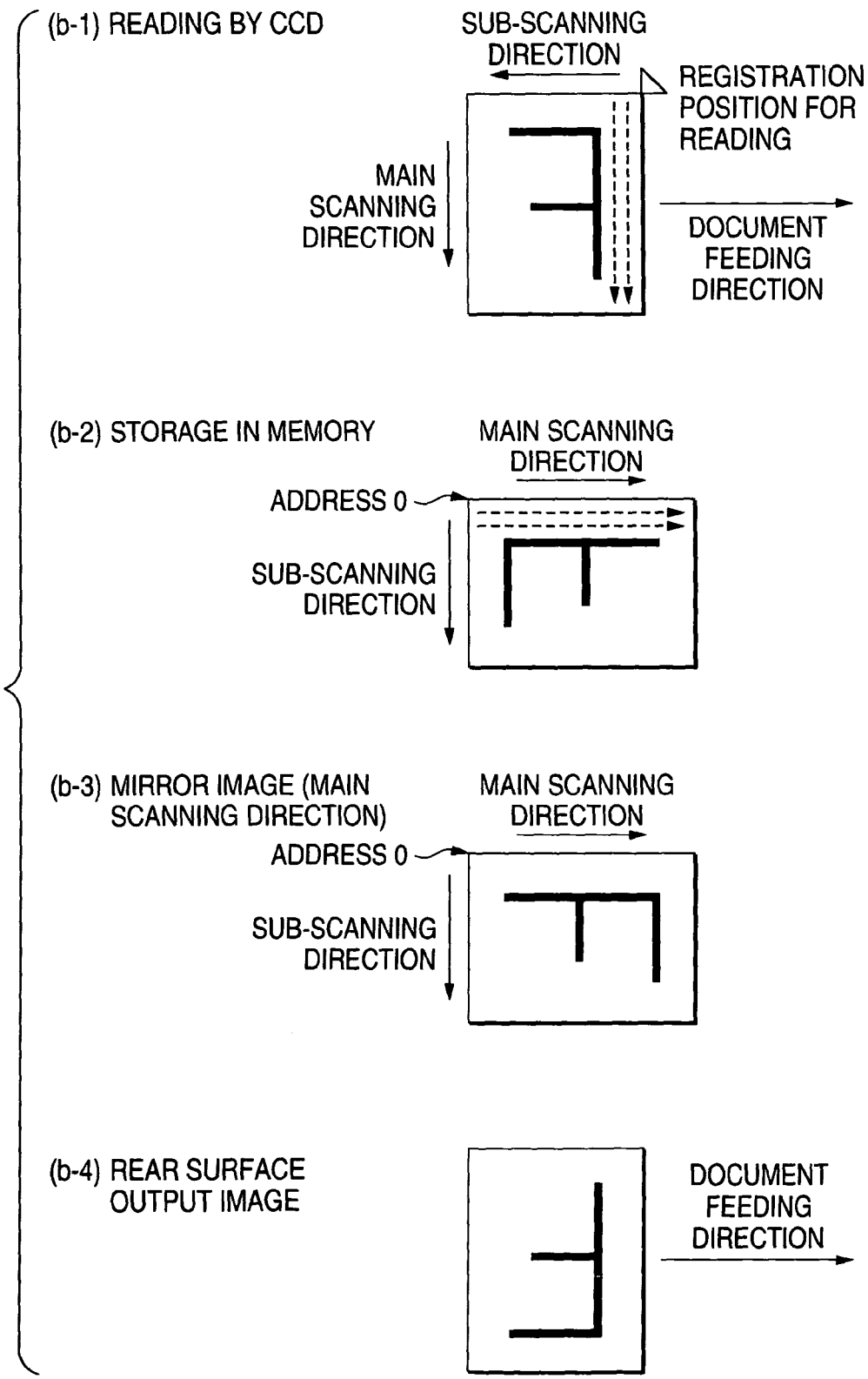

FIGS. 7A and 7B are diagrams for explaining a registration position in an inversion two-side reading mode in which images on two sides of a document are read by inverting the document and using only the CCD image sensor 78 by use of the reducing optical systems. FIG. 7A shows front surface image processing from reading of a surface image to output thereof, and FIG. 7B shows rear surface image processing from reading of a rear surface image to output thereof. In FIGS. 7A and 7B, regarding the document transported to the reading position of the second platen glass 72B that is a first reading position, with the rear side (back side) of the scanner as a registration position for reading, image reading is performed from this registration position by the line. In the first reading position, the light is applied from the downside opposed to the platen roll 19 through the platen glass 72B, and the document is read through the second platen glass 72B from the downside. Therefore, in case the first surface (front surface) of the document has arrived at the first reading position, the character "F" formed on this surface is read in a reversed state from the registration position for writing as shown in FIG. 7A(a-1). In FIG. 7A(a-1), the document feeding direction at this time, the registration position for writing, the main scanning direction and the sub-scanning direction where the data is read in order by document feeding by line are shown.

As shown by an arrow of a broken line in FIG. 7A(a-1), in each line, the image is read from the upside of the figure to the downside in the main scanning direction, and the surface image read in order in the sub-scanning direction one line by one line is saved in order in the first memory shown in FIG. 6 in a state as shown in FIG. 7A(a-2). FIG. 7A(a-2) shows a condition in which the image is saved in the first memory 104 in order from an address 0 and in the order shown by an arrow of a broken line. Here, in case that the image thus saved in the first memory 104 is read out in order of writing, an output image is in a state where the right and the left are reversed. Therefore, in order to obtain an exact image, in the embodiment, for example, by the first memory controller 105, mirror image processing in the main scanning direction is executed as shown in FIG. 7A(a-3), and the image subjected to the mirror image processing is saved in the first memory 104.

Next, when the surface image is output, it is read out in order from the address 0. FIG. 7A(a-4) shows the front surface image output from an image output unit (IOT). Further, according to a registration position for writing of the image output unit (IOT), there may be a case in which the mirror image processing is not required.

On the other hand, the rear surface of the paper transported using the inversion path as shown in FIG. 3 arrives at the first reading position similarly to the front surface. In result, the direction of the reading registration position for the image is the same between the surface and the rear surface, and a flow of the rear surface image processing shown in FIGS. 7B(b-1) to FIG. 7B(b-4) is the same as that of the front surface image processing shown in FIGS. 7A(a-1) to FIG. 7A(a-4). Further, as clear from comparison between FIG. 7A(a-4) and FIG. 7B(b-4), the output image on the front surface, and the output image on the rear surface are output in the same direction.

Next, a case where images on two sides are read simultaneously will be described.

Figure 8A:
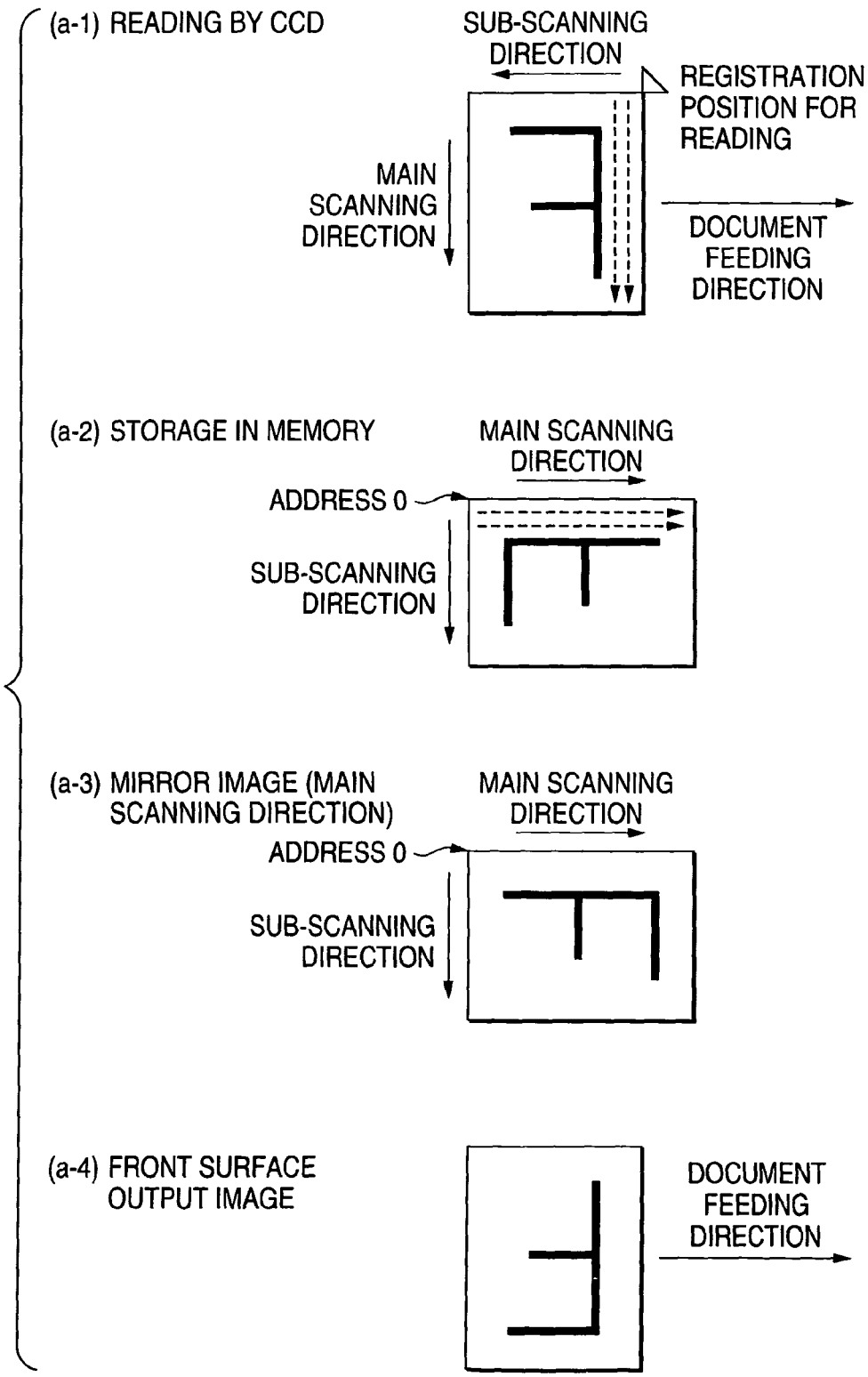
FIGS. 8A and 8B are diagrams for explaining a case where output is performed in a simultaneous two-side reading mode as it is, without taking the output states of a front surface and a rear surface into consideration.
Figure 8B:
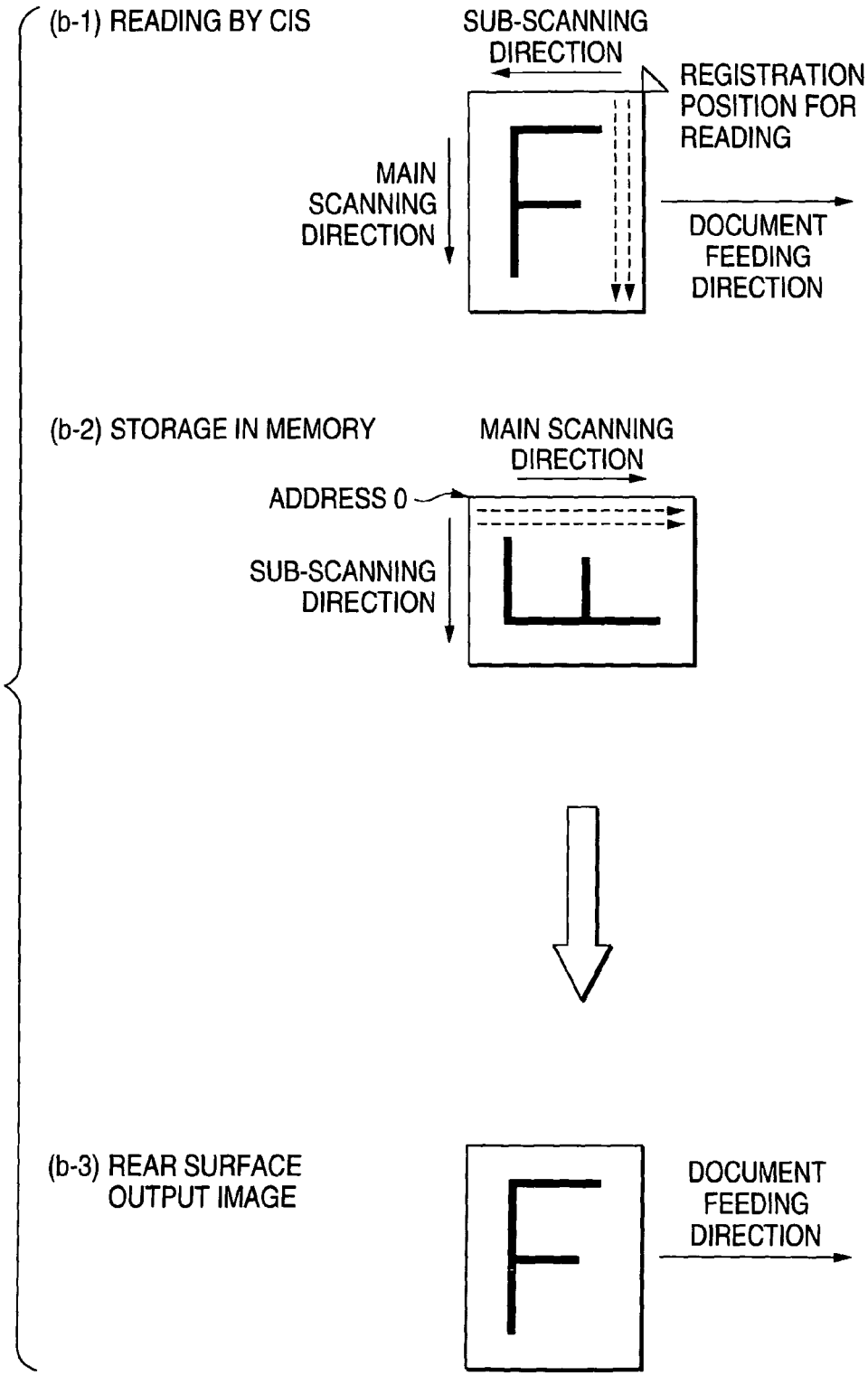

FIGS. 8A and 8B are diagrams for explaining, in a simultaneous two-side reading mode, a case where images on a front surface and a rear surface of the document are output, without taking their output condition into consideration, as they are. In case of simultaneous two-side reading, by the flow shown in FIGS. 4A and 4B, the image on the rear surface is read at a second reading position by the CIS 50. A method of reading the image on the front surface at the first reading position is similar to that in the inversion two-side reading mode shown in FIG. 7A. Accordingly, front surface image processing shown in FIG. 8A is entirely the same as that shown in FIG. 7A.

In case that the rear surface is simultaneously read by the CIS 50, the image on the rear surface is read in the second reading position in a state shown in FIG. 8B(b-1). Here, a registration position for reading by the CIS 50 is the upper right in FIG. 8B(b-1), that is, it is on the rear (back) side of the document feeder 10. As shown by an arrow of a broken line in FIG. 8B(b-1), in each line, the image is read from the upside of the figure to the downside in the main scanning direction, and the rear surface image read in order in the sub-scanning direction one line by one line is saved in the second memory 106 shown in FIG. 6 in order from the registration position for reading in a state as shown in FIG. 8B(b-2). FIG. 8B(b-2) shows a condition in which the image is saved in the second memory 106 in order from an address 0. In case that the image thus saved in the second memory 106 is read out in order of writing, an exact image as shown in FIG. 8B(b-3) is obtained. However, the rear surface output image is different from the surface output image shown in FIG. 8A(a-4) in the image state in the paper transporting direction. Namely, the front surface output image and the rear surface output image are upside down, and the surface image and the rear surface image are output in a state where they are different from the images on the document.

Therefore, in the embodiment, as shown in FIGS. 9A to 10B, even in the simultaneous two-side reading mode, image processing is performed so that the output state in its mode can become the output state in the inversion two-side reading mode shown in FIGS. 7A and 7B, that is, so that the direction of the rear surface output image can be matched with that of the front surface output image.

Figure 9B:
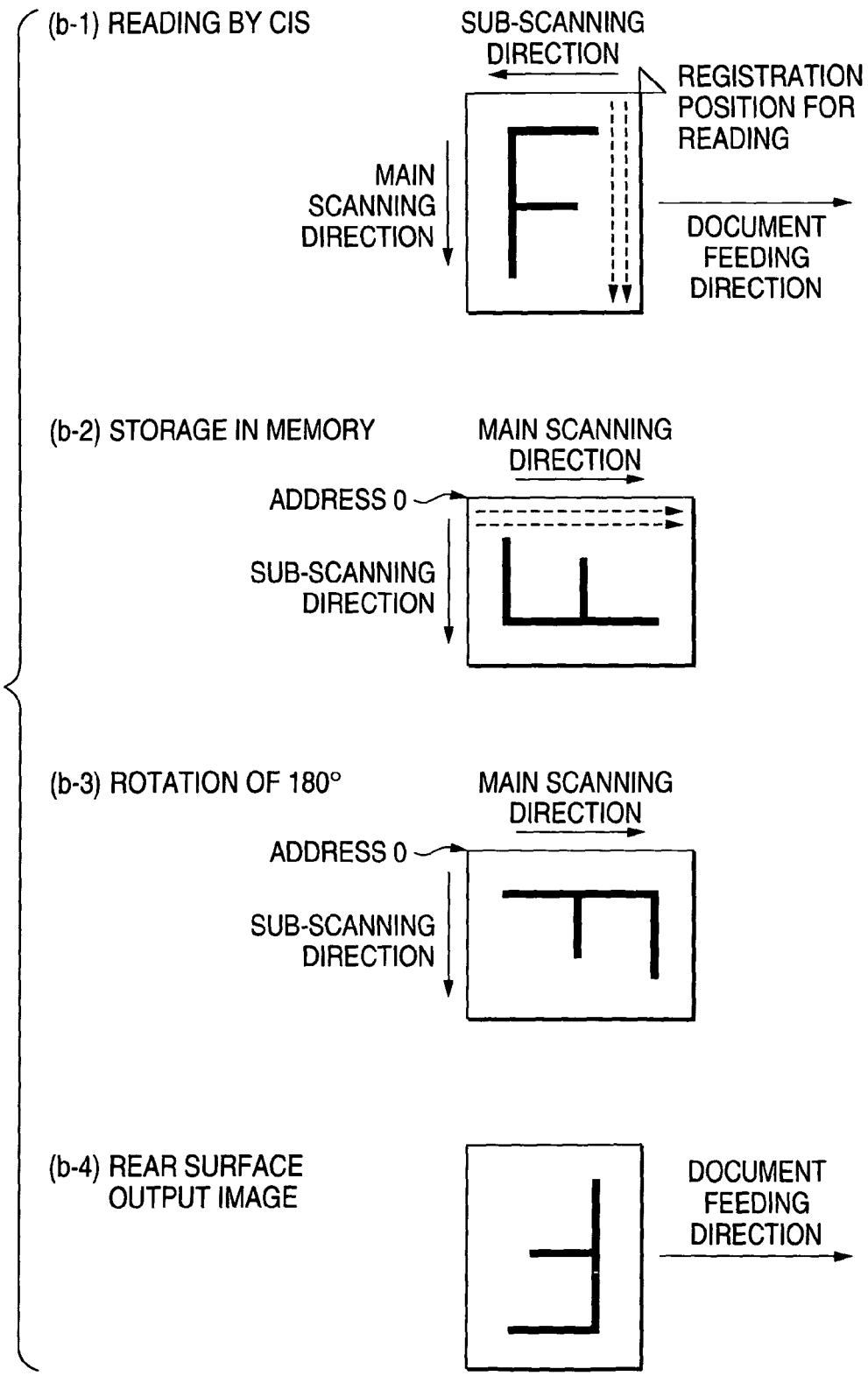

FIGS. 9A and 9B are diagram showing examples of processing for registration of the rear surface in the simultaneous two-side reading mode, in which a registration position for reading by the CIS 50 is on the rear (back) side. The image processing of front surface reading by the CCD image sensor 78 using the reducing optical system, shown in FIG. 9A is the same as the processing shown in FIGS. 7A and 8A.

With reference to FIG. 9B, image processing of the rear surface will be described in order. Firstly, reading by the CIS 50 shown in FIG. 9B(b-1) is similar to that shown in FIG. 8B(b-1). Further, in storage into the memory shown in FIG. 9B(b-2), similarly to the manner shown in FIG. 8B(b-2), the image is saved in the second memory 106 in order from an address 0 in the order shown by an arrow of a broken line. In this state, for the stored surface image shown in FIG. 9A(a-2), the rear surface image is saved in the memory in a mirror image state in the sub-scanning direction. Thereafter, by the second memory controller 107, rotation of 180° (rotation of 180° processing) is executed, so that the image is saved in the second memory 106 in the state shown in FIG. 9B(b-3). Under this state, the front surface image in the memory and the rear surface image in the memory become the same as shown in FIG. 9A(a-3) and FIG. 9B(b-3). Thereafter, when the rear surface image is output, for example, on the basis of the instruction from the first image processing section 101, the second memory controller 107 reads the image in order from the address 0 of the second memory 106. In result, the rear surface output image, as shown in FIG. 9B(b-4), is in the same state as the surface output image shown in FIG. 9A(a-4).

Further, in the embodiment, also in case that the registration position for reading by the CIS 50 is on a front side (opposite to the back side), the image after output can be put in the same state as the image in case of using the inversion path.

Figure 10A:
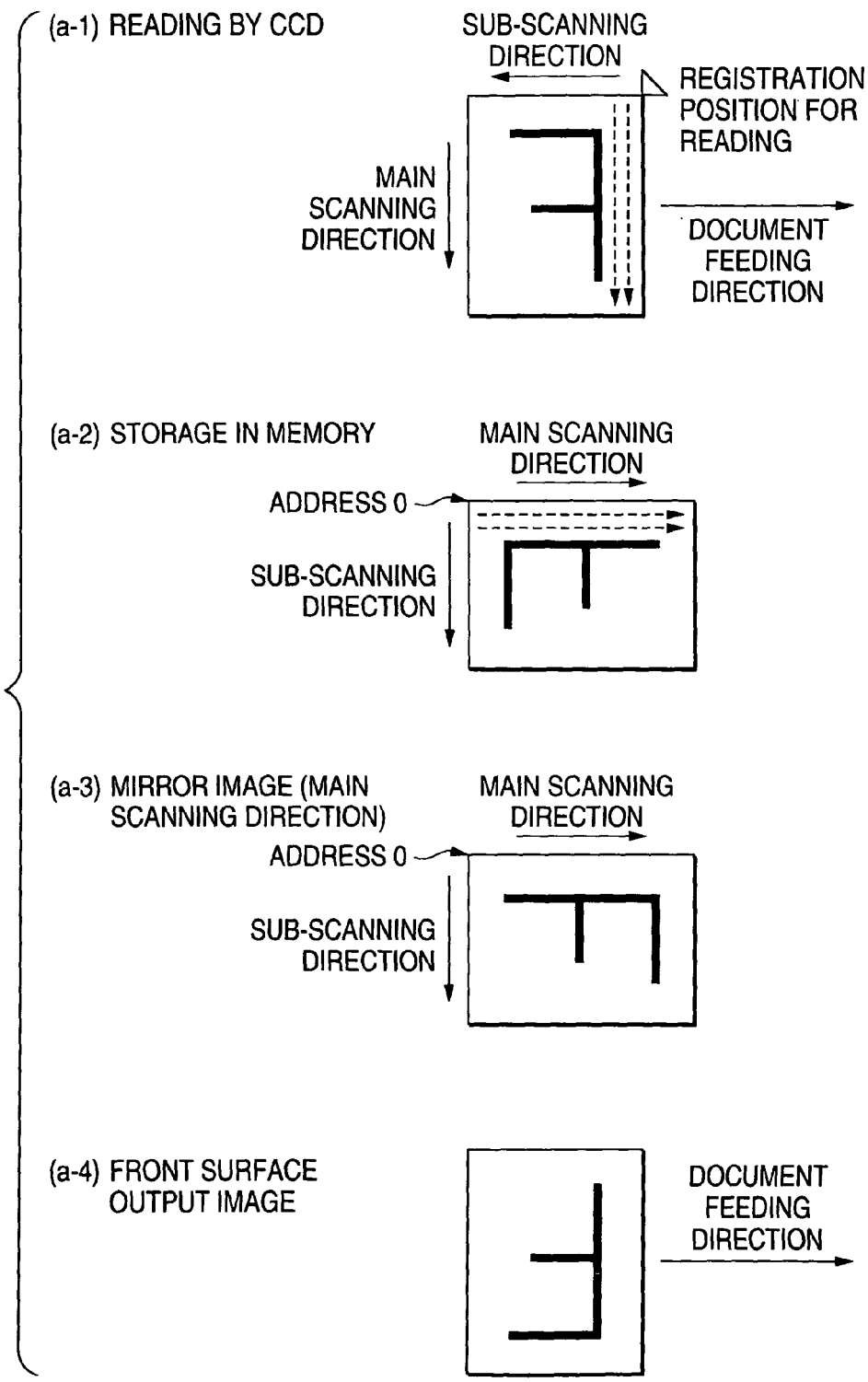
FIGS. 10A and 10B are diagrams for explaining another processing example in which the registration matching of data on the rear surface is executed in the simultaneous two-side reading mode.
Figure 10B:
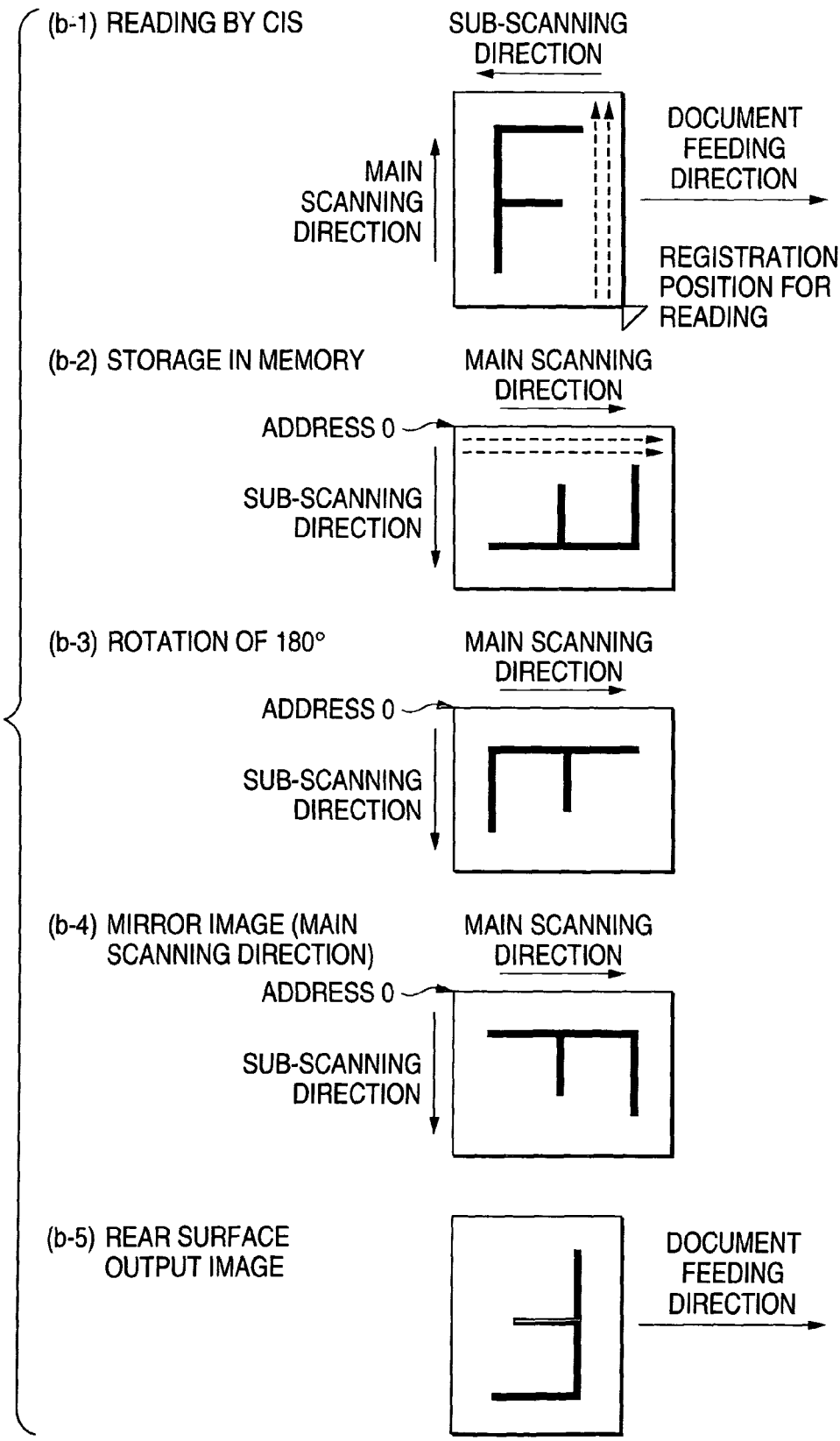

FIGS. 10A and 10B are diagram showing examples of processing for registration of the rear surface in the simultaneous two-side reading mode, in which a registration position for reading by the CIS 50 is on the front side (opposite to the back side). The image processing of the front surface reading by the CCD image sensor 78 using the reducing optical system, shown in FIG. 10A is the same as the processing shown in FIGS. 7A, 8A, and 9A.

With reference to FIG. 10B, image processing of the rear surface will be described in order. Incase that the rear surface is simultaneously read by the CIS 50, the image on the rear surface is read at the second reading position in a state shown in FIG. 10B(b-1). Here, a registration position for reading by the CIS 50 is the lower right in FIG. 10B(b-1), that is, it is on the front side of the document feeder 10. As shown by an arrow of a broken line in FIG. 10B(b-1), in each line, the image is read from the downside of the figure to the upside in the main scanning direction, and the rear surface image read in order in the sub-scanning direction one line by one line is saved in order from the registration position for reading in the second memory 106 shown in FIG. 6 in a state as shown in FIG. 10B(b-2). FIG. 10B(b-2) shows a condition in which the image is saved in the second memory 106 in order from an address 0 in the order shown by an arrow of a broken line. In FIG. 10B(b-2), the image is saved in the inversed state by 180°, compared with the stored state of the surface image shown in FIG. 10A(a-2). Therefore, the second memory controller 107 executes rotation of 180°, whereby the rear surface image is saved in the second memory 106 in the state shown in FIG. 10B(b-3). Thereafter, in order to obtain an exact image similar to the image shown in FIG. 10A(a-3), for example, by the second memory controller 107, mirror image processing as shown in FIG. 10B(b-4) is performed in the main scanning direction, and the image subjected to the mirror image processing is saved in the second memory 106. Since the surface image in the memory and the rear surface image in the memory are in the same state, the output image shown in FIG. 10A(a-4) and the output image shown in FIG.

10B(b-4) can be in the same state. Further, since a relation between the image shown in FIG. 10B(b-2) and the image shown in FIG. 10B(b-4) is the mirror image in the sub-scanning direction, without performing the processing shown in FIG. 10B(b-3), the image in FIG. 10B(b-2) may be subjected to the mirror image processing in the sub-scanning direction to put the image directly in the state shown in FIG. 10B(b-4).

In the examples shown in FIGS. 7A to 10B, the case has been described in which regarding the two-side image state of the document, the opening direction of the document is the left and right, the heaven direction is taken as the upside, and the bounded side is a leading end (or rear end) in the document feeding direction. However, this embodiment is not limited to such the case. For example, the following cases are thought: a case in which the opening direction of the document is the left and right, the heaven direction is taken as the upside, and the upper side or the lower side of the document is a leading end (or rear end) in the document feeding direction; a case in which the opening direction of the document is up and down, the heaven direction is taken as the upside, and the bounded side is a leading end (or rear end) in the document feeding direction; and a case in which the opening direction of the document is up and down, the heaven direction is taken as the upside, and the left side or the right side is a leading end (or rear end) in the document feeding direction. Even in case that the image states on the surface and rear surface of the two-sided document or the document transporting direction is thus changed, by executing the rotation processing and the mirror image processing, the surface and rear surface states of the output images can be freely set in use of the simultaneous two-side reading mode.

As described above, according to the embodiment, in the inversion two-side reading mode in which the images on the both surfaces are read from the same side by use of the inversion path, and in the simultaneous two-side reading mode in which the images on the both surfaces are read by a single document-transportation from one side and the other side on the document transporting path without using the inversion path, it is possible to output the same image in the output paper transporting direction, that is, to make the directions of the output images of the both sides the same, so that it is not necessary for the user to take these processing into consideration. Further, even in case that the read image is saved in a high capacity memory device such as a PC, the image in the same state can be saved in each two-side reading mode, so that the convenience of use by the user can be improved. Further, even in case that the two-side image states of the two-sided document and the document transporting direction are changed, by executing the rotation processing such as rotation of 180° and the mirror image processing, in the simultaneous two-side reading mode, the states of the surface output image and the rear surface output image can be optimized.

In a second embodiment, selection of a mode according to enlargement processing will be described. Parts having functions similar to the functions of the parts in the first embodiment are denoted by the same reference numerals, and their description is omitted.

In an image reading apparatus to which this embodiment is applied, in case that enlargement processing is performed, the different image processing are executed between a main scanning direction (line direction) and a sub-scanning direction (document transporting direction). In the enlargement processing in the main scanning direction, for example, to image data read with equal magnification, interpolation processing such as a 16-point projection method is applied. On the other hand, in the enlargement processing in the sub-scanning direction, according to discrete magnification such as 200% and 400%, for example, by decelerating the document transporting speed, and increasing the number of image data read mechanically, the predetermined image data is obtained. For example, in case that the user desires to obtain image data output with 141% magnification, for example, image data of 200% obtained mechanically is reduced thereby to obtain image data of 141%.

The above enlargement processing and the similar reducing processing are executed using the image processing system 100 shown in FIG. 6. Here, front surface (first surface) image data obtained from a CCD image sensor 78 and digitalized by a digital processing section 84 is subjected to image processing by a first image processing section 101, and written through a third image processing section 103 into a first memory 104. Further, rear surface (second surface) image data obtained from a CIS 50 and digitalized by a digital processing section 84 is subjected to image processing by a second image processing section 102, and saved through a third image processing section 103 into a second memory 106. Further, in this image processing system 100, other image processing than the enlargement processing and the reducing processing are also executed. When each image processing is applied to the input image data, in case that another image processing is executed after the enlargement processing, image quality deteriorates. Therefore, in order to heighten the image quality, each image processing is performed for the image data of approximately equal magnification. The image data subjected to the predetermined image processing is subjected to the enlargement processing, and saved in the first memory 104 and the second memory 106.

The enlarged image data is thus saved in the first memory 104 and the second memory 106. At this time, in case that there is the enlargement processing, the first memory 104 and the second memory 106 require memory capacity according to the magnification ration. However, since to secure the memory capacity according to the magnification ratio causes large increases of product cost, it is not preferable, Therefore, in the embodiment, in consideration of the magnification ration of the regular size document such as enlargement from A5 to A3, depending on whether the magnification ratio is 200% or less, or not, the processing is switched.

Namely, as described in the first embodiment, though a document feeder 10 in this embodiment includes an inversion two-side reading mode by use of the inversion path, and a simultaneous two-side reading mode, the registration position for reading is different between the front surface and the rear surface. Therefore, the registration position is different between the rear surface output image (having the same registration position as the registration position in surface reading) in case that a two-sided document is copied using the inversion path, and the rear surface output image (read by the CIS 50 that is a special sensor for a rear surface) copied by the simultaneous two-side reading function. This section the output image direction is different by the reading method in spite of the same document, which gives the user a malaise. Therefore, like the case in the first embodiment, by rotation of 180° processing, or mirror image processing in a main scanning direction, and mirror image processing in a sub-scanning direction, the same images in the output paper transporting direction can be output in the inversion two-side reading mode and the simultaneous two-side reading mode. However, since the registration position is different by 180° between the surface and the rear surface, in case that enlargement processing exits, the memory capacity according to the magnification ratio is required. Therefore, in the embodiment, in consideration of the magnification ratio of the regular size document (for example, enlargement from A5 to A3), the processing is switched so that the simultaneous two-side reading mode can be selected having priority over productivity in case of enlargement of 200% or less, and the inversion two-side reading mode by use of the inversion path can be selected for the purpose of cost reduction in case of enlargement of more than 200% (enlargement of 201% or more). Further, rotation of 180° processing for the enlarged image data is performed in reading after saving in the memory (first memory 104 or the second memory 106), or it is performed in saving in the memory.

Figure 11:
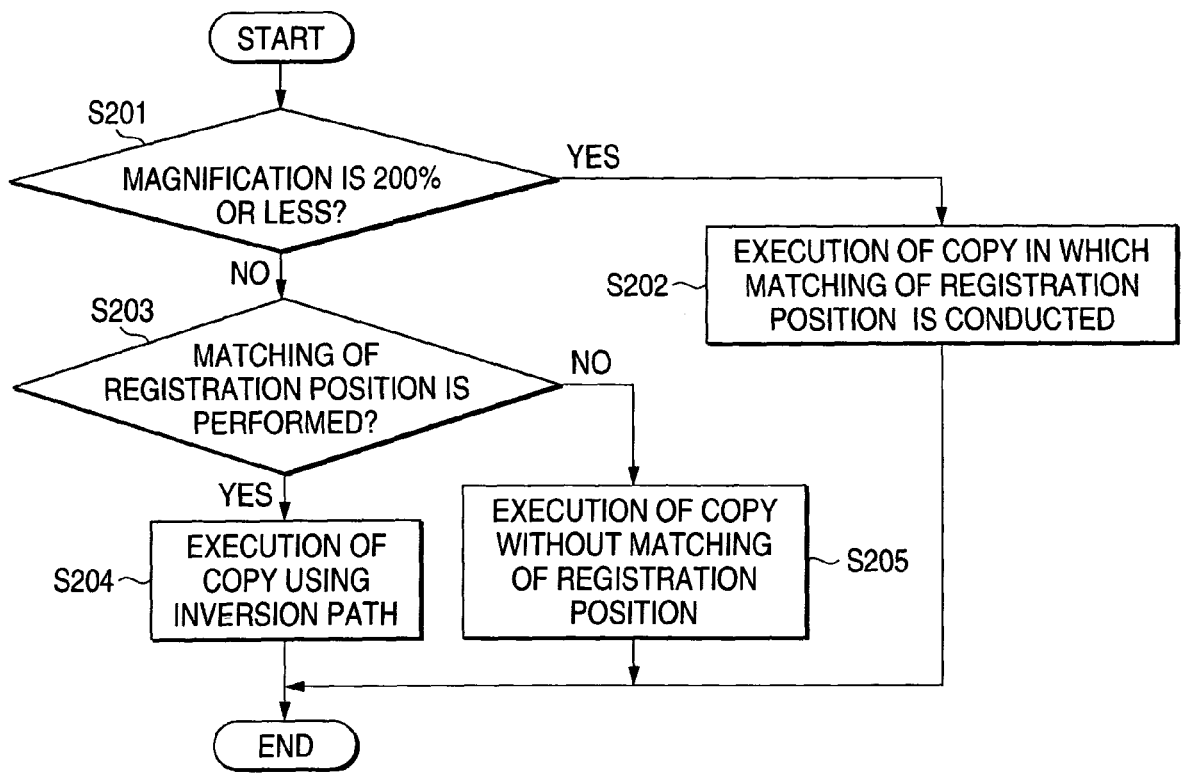
FIG. 11 is a flowchart showing flow of processing executed by an image reading control in the processing unit shown in FIG. 5.

FIG. 11 is a flowchart showing flow of processing executed by an image reading control 91 of a processing unit 80 shown in FIG. 5. The image reading control 91 firstly judges whether magnification instructed by the user or the host system is 200% or less (step 201). In case that the magnification is 200% or less, it is judged that the memory (first memory 104 or second memory 106) in which the enlarged image data is to be saved is in a permissible range, and copy in which registration (matching of registration position) is conducted is executed (step 202), whereby the processing ends. On the other hand, in case that the magnification is more than 200%, whether the registration (matching of registration position) should be performed or not is judged from the instruction of the user (step 203). Depending on the case, display for inquiry to the user may be performed. For example, in case that the registration is performed by the instruction of the user, rotation of 180° processing by use of the memory (first memory 104 or second memory 106) cannot be performed on the memory capacity. Therefore, copy is executed by reading in the inversion two-side reading mode by use of the inversion path (step 204), and the processing ends. In case that the registration is not required, copy is executed by reading in the simultaneous two-side reading mode with no registration (step 205), and the processing ends.

As described above, according to the second embodiment, in case of the large magnification power, reading in the inversion two-side reading mode by use of the inversion path is executed, whereby the memory capacity can be reduced. Further, in the limited range of the memory, the presence or absence of matching of the direction of the registration position (registration) can be selected by the user's instruction. Therefore, images having no difference in quality between the surface and the rear surface can be output. Further, according to the case, processing having priority over productivity can be also performed, so that the convenience of use by the user can be greatly improved.

As was described above, in the image reading apparatus to which the invention is applied, image data on a first surface of a document is read by a first reading section, and when the image data on the first surface of the document is read by the first reading section, image data on a second surface of the document is read by a second reading section without inverting the document. The direction of the image data on the second surface read by this second reading mean is matched with the direction of the image data on the first surface read by the first reading section, and their image data are output by an output section.

Here, the second image data read by this second reading section is saved in a saving section, and the second image data saved in this saving section is subjected by an image processing section to rotation processing and/or mirror image processing. Further, the image reading apparatus includes further an inverting and transporting section, which, after the image data on the first surface has been read by the first reading section, inverts this document and transports it. Further, the image reading apparatus is characterized in that: this first reading section can read the image data on the second surface of the document transported by the inverting and transporting section; and the output section matches the registration position in case that the image data on the second surface is read by the first reading section with the registration position in case that the image data on the second surface is read by the second reading section, and thereafter outputs their image data. Hereby, even in case that the two-sided document is read by using either of the functions, since the same image in the output paper transporting direction can be output, the image reading apparatus of the invention is preferable.

Further, seeing from another viewpoint, in the image reading apparatus to which the invention is applied, the image data on the first surface of the document is read from a first direction by the first reading section, and the image data on the second surface of the document is read by the second reading section from a second direction which is different from the first direction by this first reading section. The image processing is applied to the image data on the second surface read by the second reading section so that the direction of its image can be matched with the direction of the image to be obtained in case that the image data on the second surface is read from the first direction similarly to the case of reading of the first surface of the document.

The image reading apparatus further includes a saving section which saves the image data on the second surface read by this second reading section, and is characterized in that this saving section saves the image data subjected to at least any one of the following image processing by the processing section: rotation of 180° processing, a mirror image processing in a main scanning direction, and a mirror image processing in a sub-scanning direction.

On the other hand, an image processing system to which the invention is applied includes an input section which inputs image data on a first surface of a document, and inputs image data on a second surface of the document before completing input of the image data on this first surface; a processing section, which applies the predetermined image processing to the first image data on the first surface and/or the second image data on the second surface, input by this input section so that their data can be output with directions of their data matched; and an output section which outputs the image data on the first surface and the image data on the second surface to which the image processing has been applied by this processing section. Here, this processing section includes an image processing section which processes each of the image data on the first surface and the image data on the second surface; a memory which save each of the image data on the first surface and the image data on the second surface; and a memory controller which controls writing/reading for this memory.

Further, a method of matching registrations positions of a two-sided document comprises the steps of: inputting image data on a first surface of a transported document and inputting image data on a second surface read without inverting the transported document; and applying rotation processing and/or mirror image processing to the read image data on the second surface thereby to output the image data on the second surface in a state where the direction of output image data of the second surface is matched with the direction of output image data of the first surface. Further, this method is characterized in that the input image data on the second surface is saved in the memory and the rotation processing and/or the mirror image processing are/is applied to the image data on the second surface saved in this memory.

Further, seeing from another viewpoint, the method of matching registrations positions of the two-sided document to which the invention is applied is characterized in that: there are provided a first sensor which reads the image on the first surface of the document from one side of a transporting path in which the document is transported, and a second sensor which reads the image on the second surface of the document from the other side of the transporting path; there are a first reading mode in which two sides of the document are read using this first sensor plural times, and a second reading mode in which two sides of the document are read using the first sensor and the second sensor; and a registration position of an output image in case that the two sides of the document are read in the first reading mode is matched with a registration position of an output image in case that the two sides of the document are read in the second reading mode. Further, switching of these modes can be determined by user's instruction (selection), or by quality of the selected output image, for example, by a monochromatic image or a color image.

Further, an image reading apparatus to which the invention is applied includes a paper supply section which supplies a document; a transporting path for transporting the document supplied from this paper supply section; a first sensor which reads an image on a first surface of the document from one side of the transporting path; a second sensor which reads an image on a second surface of the document from the other side of the transporting path; a controller which selects a first reading mode in which two sides of the document are read using the first sensor plural times, or a second reading mode in which two sides of the document are read using the first sensor and the second sensor, and which gives an instruction of enlargement processing; and an image processing section which executes, when the second reading mode is selected by this controller and the instruction of enlargement processing is given, processing of making direction of registration positions of output images for the read image data on the both surfaces the same.

Here, this controller, in case that magnifying power is the predetermined value or less, causes the image processing section to execute matching of the directions of the registration positions by rotation of 180° processing. This predetermined value is magnifying power of 200% by which paper regular size of the document is obtained.

Further, as long as the image reading apparatus is characterized in that this controller selects the first reading mode when the magnifying power exceeds the predetermined value and matching of registration positions is required, even in case that memory capacity runs short, matching of the directions of registration positions can be performed. Therefore, the invention is preferable.

Further, seeing from another viewpoint, the image reading apparatus to which the invention is applied includes an enlargement processing section which applies enlargement processing to the image data on the first surface read by the first reading section and the image data on the second surface read by the second reading section; and a registration position matching section which applies rotation processing to the image on the second surface by use of a memory for saving the image data on the second surface which has been subjected to the enlargement processing by this enlargement processing section thereby to match the direction of the image data on the second surface with the direction of the image data on the first surface read by the first reading section.

Here, the image reading apparatus is characterized in that: in case that magnifying power by this enlargement processing section is the predetermined value or less, rotation processing can be performed by the registration position matching section.

Further, the image reading apparatus is characterized in that: in case that the magnifying power by this enlargement processing section exceeds the predetermined value, and matching of registration position is performed, the document is inverted and the image data on the both sides are read in order, using the first reading section.

The entire disclosure of Japanese Patent Application No. 2003-405629 filed on Dec. 4, 2003 including specification, claims, drawings and abstract is incorporated herein by reference in its entirety.

What is claimed is:

1. An image reading apparatus comprising:
   a paper supply section which supplies a document;
   a transporting path which transports the document supplied from the paper supply section;
   a first sensor which reads an image on a first surface of the document from one side of the transporting path;
   a second sensor which reads an image on a second surface of the document from the other side of the transporting path; and
   an image processing section which is constituted so as to correspond to a first reading mode in which two sides of the document are read using the first sensor plural times, and a second reading mode in which two sides of the document are read using the first sensor and the second sensor, and which makes a registration position and direction of an output image in case that the two sides of the document are read in the first reading mode the substantially same as a registration position and direction of an output image in case that the two sides of the document are read in the second reading mode.

2. The image reading apparatus according to claim 1, wherein the image processing section performs, for the image read in at least one of the first reading mode and the second reading mode, at least any one of the following image processing: rotation of 180° processing, a mirror image processing in a main scanning direction, and a mirror image processing in a sub-scanning direction.

3. The image reading apparatus according to claim 1, further comprising:
   a first memory which saves the image on the first surface read by the first sensor; and
   a second memory which saves the image on the second surface read by the second sensor;
   wherein the image processing section performs processing of matching the registration position and direction by use of at least one of the first memory and the second memory.

4. An image reading apparatus comprising:
   a first reading section which reads image data on a first surface of a document;
   a second reading section which reads, when the image data on the first surface of the document is read by the first reading section, image data on a second surface of the document without inverting the document; and
   an output section which matches a direction of the image data on the second surface read by the second reading section with a direction of the image data on the first surface read by the first reading section, and thereafter outputs those image data,
   an inverting and transporting section, which, after the image data on the first surface has been read by the first reading section, inverts the document and transports the document;
   wherein the first reading section is capable of reading the image data on the second surface of the document transported by the inverting and transporting section; and wherein the output section matches a registration position in case that the image data on the second surface is read by the first reading section with a registration position in case that the image data on the second surface is read by the second reading section, and thereafter outputs those image data.

5. The image reading apparatus according to claim 4, further comprising:
a saving section which saves the image data on the second surface read by the second reading section; and
an image processing section which applies at least one of rotation processing and mirror image processing to the image data saved in the saving section.

6. An image reading apparatus comprising:
a first reading section which reads image data on a first surface of a document from a first direction;
a second reading section which reads image data on a second surface of the document from a second direction which is different from the first direction; and
an image processing section which is constituted so as to correspond to a first reading mode in which two sides of the document are read using the first reading section plural times, and a second reading mode in which two sides of the document are read using the first reading section and the second reading section, and which makes a registration position and direction of an output image in case that the two sides of the document are read in the first reading mode the substantially same as a registration position and direction of an output image in case that the two sides of the document are read in the second reading mode.

7. The image reading apparatus according to claim 6, further comprising:
a saving section which saves the image data on the second surface read by the second reading section;
wherein the saving section saves the image data subjected to at least any one of the following image processing by the processing section: rotation of 180° processing, a mirror image processing in a main scanning direction, and a mirror image processing in a sub-scanning direction.

8. A method of matching registration positions of read two-side images comprising:
providing a first sensor which reads an image on a first surface of a document from one side of a transporting path in which the document is transported
providing a second sensor which reads an image on a second surface of the document from the other side of the transporting path;
preparing a first reading mode in which two sides of the document are read using the first sensor plural times;
preparing a second reading mode in which two sides of the document are read using the first sensor and the second sensor; and
matching a registration position of an output image in case that the two sides of the document are read in the first reading mode with a registration position of an output image in case that the two sides of the document are read in the second reading mode.

9. An image reading apparatus comprising:
a paper supply section which supplies a document;
a transporting path which transports the document supplied from the paper supply section;
a first sensor which reads an image on a first surface of the document from one side of the transporting path;
a second sensor which reads an image on a second surface of the document from the other side of the transporting path;
a controller which selects a first reading mode in which two sides of the document are read using the first sensor plural times, or a second reading mode in which two sides of the document are read using the first sensor and the second sensor, and which gives an instruction of enlargement processing; and
an image processing section which executes, when the second reading mode is selected by the controller and the instruction of enlargement processing is given, processing of making registration positions and directions of output images for the read image data on the both surfaces the substantially same.

10. The image reading apparatus according to claim 9, wherein the controller, in case that magnifying ratio is a predetermined value or less, causes the image processing section to execute matching of the registration positions and directions by rotation of 180° processing.

11. The image reading apparatus according to claim 10, wherein the predetermined value is magnifying ratio of 200%.

12. The image reading apparatus according to claim 9, wherein the controller selects the first reading mode when the magnifying ratio exceeds the predetermined value and matching of registration positions and directions is required.

13. An image reading apparatus comprising:
a first reading section which reads image data on a first surface on a document;
a second reading section which reads, when the image data on the first surface of the document is read by the first reading section, image data on a second surface of the document without inverting the document;
an enlargement processing section which applies enlargement processing to the image data on the first surface read by the first reading section and the image data on the second surface read by the second reading section; and
a registration position matching section which applies rotation processing to the image on the second surface by use of a memory for saving the image data on the second surface which has been subjected to the enlargement processing by the enlargement processing section thereby to match a direction of the image data on the second surface with a direction of the image data on the first surface read by the first reading section,
wherein in case that a magnifying ratio for the enlargement by the enlargement processing section is a predetermined value or less, the registration position matching section is capable of performing rotation processing.

14. An image reading apparatus comprising:
a first reading section which reads image data on a first surface on a document;
a second reading section which reads, when the image data on the first surface of the document is read by the first reading section, image data on a second surface of the document without inverting the document;
an enlargement processing section which applies enlargement processing to the image data on the first surface read by the first reading section and the image data on the second surface read by the second reading section; and
a registration position matching section which applies rotation processing to the image on the second surface by use of a memory for saving the image data on the second surface which has been subjected to the enlargement processing by the enlargement processing section thereby to match a direction of the image data on the second surface with a direction of the image data on the first surface read by the first reading section,
wherein in case that a magnifying ratio for the enlargement by the enlargement processing section exceeds a predetermined value, and matching of registration positions is performed, the document is inverted and the image data on the both sides are read in order, using the first reading section.

* * * * *